United States Patent
Kabir et al.

(10) Patent No.: US 12,481,960 B1
(45) Date of Patent: Nov. 25, 2025

(54) METHOD AND SYSTEM FOR ROBOTIC PLATFORM CONTROL AND MULTI-DIMENSIONAL MODEL ENVIRONMENT RECONSTRUCTION

(71) Applicant: Corvus Robotics, Inc., Mountain View, CA (US)

(72) Inventors: Mohammed Hanif Kabir, Mountain View, CA (US); Parker Chase Lusk, Clermont, FL (US); Yue Wu, Mountain View, CA (US)

(73) Assignee: Corvus Robotics, Inc., Mountain View, CA (US)

( * ) Notice: Subject to any disclaimer, the term of this patent is extended or adjusted under 35 U.S.C. 154(b) by 0 days.

(21) Appl. No.: 19/050,499

(22) Filed: Feb. 11, 2025

(51) Int. Cl.
| | |
|---|---|
| *G06Q 10/087* | (2023.01) |
| *B64U 10/14* | (2023.01) |
| *B64U 101/30* | (2023.01) |
| *B64U 101/70* | (2023.01) |
| *G06V 20/40* | (2022.01) |

(52) U.S. Cl.
CPC ........... *G06Q 10/087* (2013.01); *B64U 10/14* (2023.01); *G06V 20/41* (2022.01); *B64U 2101/30* (2023.01); *B64U 2101/70* (2023.01)

(58) Field of Classification Search
CPC .. G06Q 10/087; B64U 10/14; B64U 2101/30; B64U 2101/70; G06V 20/41
See application file for complete search history.

(56) References Cited

U.S. PATENT DOCUMENTS

| | | | |
|---|---|---|---|
| 2017/0206648 A1* | 7/2017 | Marra | G05D 1/0094 |
| 2021/0090294 A1* | 3/2021 | Ramos | G06V 10/10 |
| 2022/0148156 A1* | 5/2022 | Dwivedi | G06T 7/73 |
| 2024/0144141 A1* | 5/2024 | Cella | G06Q 30/0206 |

\* cited by examiner

*Primary Examiner* — Florian M Zeender
*Assistant Examiner* — Kimberly S. Bursum
(74) *Attorney, Agent, or Firm* — Dority & Manning, P.A.

(57) ABSTRACT

A system and method for detecting and counting objects in a warehouse environment is disclosed. The system may receive sensor data indicative of a warehouse environment. The method includes generating, based on the sensor data, a reconstruction of the warehouse environment, The reconstruction can include one or more slots comprising a plurality of objects. The method includes determining, based on the reconstruction, a number of occluded objects. The method includes determining, based on the reconstruction and the number of occluded objects, a total number of objects within each slot of the one or more slots.

18 Claims, 10 Drawing Sheets

METHOD AND SYSTEM FOR ROBOTIC PLATFORM CONTROL AND MULTI-DIMENSIONAL MODEL ENVIRONMENT RECONSTRUCTION

BACKGROUND

The present disclosure is in the technical field of robotic platform control. Generally robotic platforms are designed to perform repetitive tasks without tiring, reduce errors, and increase efficiency.

SUMMARY

The present disclosure is directed to controlling one or more robotic platforms and computing systems to automate the management of warehouse inventory. For example, the present disclosure may utilize sensor data captured by autonomous drone sensors and machine-learned models to generate a three-dimensional semantic reconstruction of a warehouse environment, enabling visible and occluded objects to be detected and counted without the need for human intervention.

For example, objects in a warehouse environment may be stored on pallets, on the floor of the warehouse environment, on inventory shelving units (e.g., racks), etc. In some implementations, objects may be stored in an assigned slot based on a warehouse topology that organizes the various objects to enable more efficient ingress and egress of the objects through the warehouse environment. However, some objects may be stored in numerous quantities on pallets, or on the floor of the warehouse environment in a manner that makes accounting for each of the objects difficult. For instance, objects may be a set of uniformly stacked boxes (e.g., 5×5×5, etc.), a plurality of loose objects bound together, or even large/bulk items such as appliances stacked several feet high on the floor. The manner in which objects are stored within each slot may make it difficult to account for each object. For instance, some of the objects may be partially or completely occluded from view. Moreover, manually manipulating the objects in a slot for inventory management purposes may be impractical and inefficient due to the size, location, or method used to bind the objects together.

Aspects of the present disclosure leverage robotic platforms, along with machine-learned models to count visible and occluded objects in a warehouse environment without human intervention. For example, an autonomous drone may include one or more sensors configured to capture sensor data as it operates within a warehouse environment. The drone sensors may capture sensor data such as image data, Light Detection and Ranging (LIDAR) data, radar data, or other types of sensor data (e.g., sound navigation and ranging (sonar), etc.). While examples herein describe an autonomous drone as a means of capturing sensor data within the warehouse environment, the present disclosure is not limited to such embodiment and any means of data capture such as stationary or moveable cameras, LIDAR on a stick, forklift sensors, etc. may be used.

The sensor data may depict various objects such as inventory items stored in respective slots within the warehouse environment. A slot may include a location within the warehouse environment designated or assigned to store a particular object (e.g., inventory item). As the drone captures sensor data, machine-learned models may be used to process the sensor data to generate a semantic reconstruction of the warehouse environment. For instance, a semantic fusion machine-learned model may process the sensor data and generate a three-dimensional semantic reconstruction of the warehouse environment that includes a representation of slots depicted in the sensor data where objects (e.g., inventory items) are stored. A three dimensional semantic reconstruction may include a three dimensional representation of each slot depicted in the sensor data. For instance, the semantic reconstruction may include the three dimensional size of the slot itself and the three dimensional size of depicted objects within the slot. In an embodiment, a four dimensional size of the slot and depicted object may be generated which may include the three dimensional pose of the slot and objects over a plurality of time steps.

By way of example, the semantic fusion model may receive sensor data including a plurality of image frames captured sequentially over time. The semantic fusion model may detect a slot and a stack of boxes within the slot in a first image frame. The first image frame may depict the slot and the stack of boxes from a first angle (e.g., front angle). Based on the first image the semantic fusion model may generate a semantic reconstruction of the slot including the stacked boxed. The semantic reconstruction may include a three-dimensional representation of the volume of the slot and the volume of the stacked objects within the slot.

In an embodiment, the semantic fusion model may receive a second image frame of the slot and the stack of boxes. The second image frame may depict the slot from a side angle (e.g., or top angle, bottom angle, etc.). For instance, the second image frame may depict the slot and stacked boxes from the right or left side and provide additional dimensional data (e.g., depth, etc.) for the size of the slot and stack of boxes that were not visible in the first image frame. In this manner, the semantic fusion model may process a plurality of image frames to generate and iteratively update a three-dimensional semantic reconstruction of the slot and visible objects therein. While examples herein describe the use of image frames, the present disclosure is not limited to such embodiment and other types of sensor data such as LIDAR, radar, etc. may be used to generate the semantic reconstruction.

Based on the semantic reconstruction, a combinatorial optimization machine-learned model may process the three-dimensional reconstruction to determine objects (e.g., within the stack of objects) that may be stored within the slot but are occluded from view. For instance, the semantic fusion model may classify objects as detected objects, or partially occluded objects within the slot. The classified objects may be tracked over a plurality of sensor data inputs (e.g., image frames, etc.). Classifying objects may include color coding the objects, labeling the objects, or any method of concatenating objects across multiple image frames or sensor inputs. Objects which are classified as detected objects may be accounted for in the semantic reconstruction as being within the total volume (e.g., three dimensional volume) of the slot. Objects detected as partially occluded may be partially (e.g., visible portion) accounted for within the total volume of the slot.

The combinatorial optimization model may be configured to analyze the semantic reconstruction and determine the three-dimensional size of the partially occluded objects and determine a number of completely occluded objects within the stack of objects. For example, the combinatorial optimization model may employ a set of physics rules and/or machine-learning algorithms to determine the number of occluded objects and the remaining size of the partially occluded objects.

By way of example, the combinatorial optimization model may employ a "packing problem" algorithm to analyze the semantic reconstruction. The "packing problem" algorithm may associate each object (e.g., in the stack of objects) with a cuboid of minimum size under continuous rotations, translations, and allowable distances within the three-dimensional size of the slot. A cuboid may include a three-dimensional shape such as a hexahedron with quadrilateral faces that may be represented in the semantic reconstruction. While examples herein describe cuboids, the present disclosure is not limited to such embodiment and any three dimensional shapes may be used.

For instance, the combinatorial optimization model may approximate cuboids for the objects classified as detected objects. Based on the remaining volume (e.g., in the semantic reconstruction), the combinatorial optimization model may iteratively apply the "packing problem" algorithm to the objects classified as partially occluded and the remaining occluded volume in the slot to approximate cuboids that satisfy the constraints of the volume of the slot. In this manner, the combinatorial optimization model may determine a number of occluded objects based on the semantic reconstruction.

An object counting machine-learned model may receive the semantic reconstruction which includes a plurality of cuboids fit to the detected objects, the partially detected objects, and the occluded objects to determine the total number of objects in the slot. As the drone operates throughout the warehouse environment, total counts of objects stored in each slot may be computed. In an embodiment, the total count of objects may be transmitted to an inventory management system to automatically update the current inventory of the warehouse. In this manner, the technology of the present disclosure provides real-time inventory updates for inventory management systems without the need for human intervention. Moreover, the technology of the present disclosure enables object detection and counting without relying on static inventory data which may be inaccurate.

The technology of the present disclosure may provide a number of technical benefits for improvements for computing systems. For instance, by utilizing trained machine-learned models, the computing system is able to generate three-dimensional semantic reconstructions and determine a number of occluded objects more efficiently and consistently over time while using less sensor data. This also decreases computing resources needed to process large quantities of sensor data over time.

As another example, by using a semantic fusion model to stitch together sensor data inputs, semantic data extracted in a first sensor data input may be supplemented by subsequent sensor data inputs to allow the semantic reconstruction to be generated more efficiently while preserving computing resources. For instance, an autonomous drone may capture a first sensor data input of a slot during a flight. However, the angle of the first sensor data input may not yield sufficient semantic details to generate a high quality semantic reconstruction.

In an embodiment, another sensor capture means (e.g., stationary camera, another drone etc.) may capture additional sensor data to supplement the semantic reconstruction with additional semantic information. In this manner, the drone may preserve computing resources that would otherwise be expended adjusting flight plans, rerouting, etc., to capture various angles of the slot. For example, the autonomous drone may focus on more discrete tasks such as active avoidance and inventory tracking. This helps to reduce the complexity of training or building heuristics for the autonomy system of the drone.

As yet another example, the technology of the present disclosure reduces or eliminates the need of traditional inventory counting methods that include manual scanning each item, manipulation of items, and use of heavy machinery such as forklifts that ultimately decrease human error in the counting process and increase safety in warehouse environments.

For example, in an aspect, the present disclosure provides an example computer-implemented method. The method may include receiving sensor data indicative of a warehouse environment. The method may include generating, based on the sensor data, a reconstruction of the warehouse environment, wherein the reconstruction includes one or more slots including a plurality of objects. The method may include determining, based on the reconstruction, a number of occluded objects. The method may include determining, based on the reconstruction and the number of occluded objects, a total number of objects within each slot of the one or more slots.

In some embodiments, the sensor data includes at least one of (i) image data, (ii) LIDAR data, (iii) radar data, or (iv) video data.

In some embodiments, the (i) image data includes a plurality of image frames depicting at least one slot of the one or more slots from a plurality of angles.

In some embodiments, the sensor data is received from a drone operating within the warehouse environment.

In some embodiments, generating the reconstruction includes detecting a first object in a first slot depicted in the sensor data at first time. In some embodiments, generating the reconstruction includes detecting the first object in the first slot depicted in the sensor data at a second time. In some embodiments, generating the reconstruction includes classifying the first object in the first slot as a detected object or a partially occluded object.

In some embodiments, the method includes concatenating a cuboid to the first object, the cuboid indicative of a three-dimensional representation of the first object in the first slot within the reconstruction. In some embodiments, the method includes determining, based on the cuboid, one or more voids within the first slot, the one or more voids associated with an occluded three-dimensional space within the first slot.

In some embodiments, method includes determining, based on the cuboid and the one or more voids within the first slot, the number of occluded objects. In some embodiments, the method includes determining, based on the number of occluded objects and first object, the total number of objects.

In some embodiments, the method includes determining a three-dimensional size of each slot of the one or more slots.

In some embodiments, the one or more slots includes at least one of (i) a defined inventory rack location, (ii) a defined inventory shelf location, or (iii) a defined floor location within the warehouse environment.

In some embodiments, the method includes accessing inventory data indicative of an anticipated location of the one or more slots within the warehouse environment.

In some embodiments, the method includes transmitting data indicative of the total number of objects within each slot to a remote computing system.

In some embodiments, the reconstruction is at least one of a (i) three-dimensional or (ii) four-dimensional representation of the one or more slots within the warehouse environment.

In an aspect, the present disclosure provides an example computing system. The computing system may include one or more processors and one or more non-transitory computer-readable media storing instructions that when executed cause the computing system to perform operations. The operations include receiving sensor data indicative of a warehouse environment. The operations include generating, based on the sensor data a reconstruction of the warehouse environment, wherein the reconstruction includes one or more slots including a plurality of objects. The operations include determining, based on the reconstruction, a number of occluded objects. The operations include determining, based on the reconstruction and the number of occluded objects, a total number of objects within each slot of the one or more slots.

In some embodiments, the sensor data includes at least one of (i) image data, (ii) LIDAR data, (iii) radar data, or (iv) video data.

In some embodiments, the (i) image data comprises a plurality of image frames depicting at least one slot of the one or more slots from a plurality of angles.

In some embodiments, the sensor data is received from a drone operating within the warehouse environment.

In some embodiments, generating the reconstruction includes detecting a first object in a first slot depicted in the sensor data at first time. In some embodiments, generating the reconstruction includes detecting the first object in the first slot depicted in the sensor data at a second time. In some embodiments, generating the reconstruction includes classifying the first object in the first slot as a detected object or a partially occluded object.

In some embodiments, the operations include concatenating a cuboid to the first object, the cuboid indicative of a three-dimensional representation of the first object in the first slot within the reconstruction. In some embodiments, the operations include determining, based on the cuboid, one or more voids within the first slot, the one or more voids associated with an occluded three-dimensional space within the first slot.

In some embodiments, the operations include determining, based on the cuboid and the one or more voids within the first slot, the number of occluded objects. In some embodiments, the operations include determining, based on the number of occluded objects and first object, the total number of objects.

In an aspect, the present disclosure provides an example non-transitory computer-readable media storing instructions that are executable by one or more processors to perform operations. The operations include receiving sensor data indicative of a warehouse environment. The operations include generating, based on the sensor data a reconstruction of the warehouse environment, wherein the reconstruction includes one or more slots including a plurality of objects. The operations include determining, based on the reconstruction, a number of occluded objects. The operations include determining, based on the reconstruction and the number of occluded objects, a total number of objects within each slot of the one or more slots.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous drone within a warehouse environment for example purposes only. As described herein, the technology described herein is not limited to an autonomous drone and may be implemented for or within other warehouse equipment (e.g., forklifts, etc.) and other computing systems in one or more other types of environments.

Figure 1:
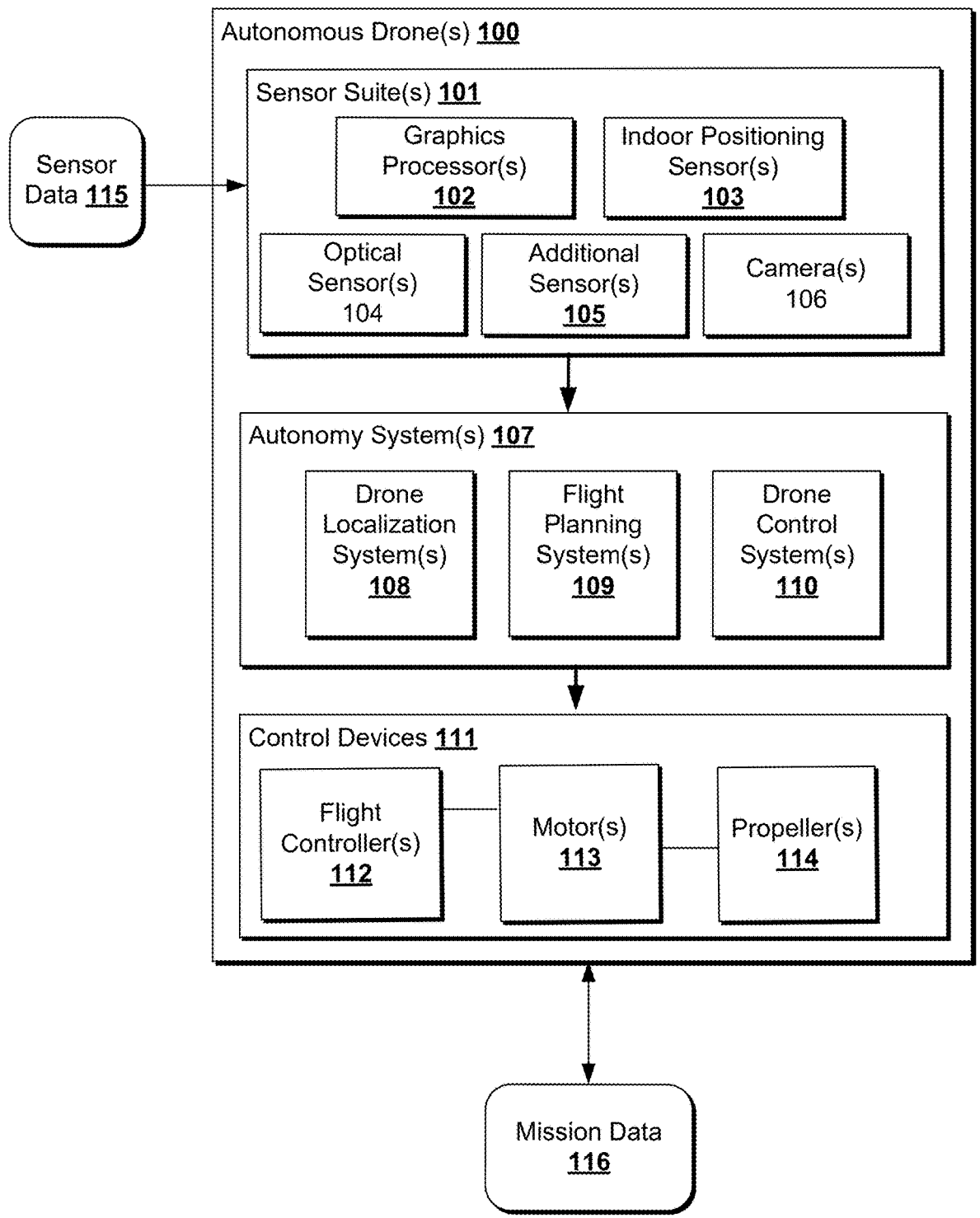
FIG. 1 is a block diagram of an example computing system of an autonomous drone, according to some implementations of the present disclosure.

With reference to FIGS. 1-10, example embodiments of the present disclosure are discussed in further detail. FIG. 1 is a block diagram of an example computing system of an autonomous drone according to example implementations of the present disclosure. The example autonomous drone 100 can include a number of subsystems for performing various operations. The subsystems may include a sensor suite 101, autonomy system 107, and control devices 111. The autonomous drone 100 may be any type of aerial vehicle configured to operate within a warehouse environment. For example, the autonomous drone 100 may be a vehicle configured to autonomously perceive and operate within the warehouse environment. This can include multi-rotor drones, fixed-wing drones, single-rotor drones, or fixed-wing hybrid VTOL (e.g., vertical take-off landing) drones. The autonomous drone 100 may be an autonomous vehicle that can control, be connected to, or be otherwise associated with implements, attachments, and/or accessories for scanning inventory items within a warehouse environment. For example, the autonomous drone 100 may include a forklift or other ground-based vehicle.

The autonomy system 107 can be implemented by one or more onboard computing devices. This can include one or more processors and one or more memory devices. The one or more memory devices can store instructions executable by the one or more processors to cause the one or more processors to perform operations or functions associated with the subsystems. The computing resources of the autonomy system 107 can be shared among its subsystems, or a subsystem can have a set of dedicated computing resources.

The example autonomous drone 100 may include a sensor suite 101 which can include different subsystems for performing various sensory operations. The subsystems may include graphics processors 102, indoor positioning sensors 103, optical sensors 104, additional sensors 105 (e.g., LiDAR, RADAR, laser scanner, photodetector array, etc.), and cameras 106 (e.g., wide angle cameras, narrow angle cameras, etc.).

The graphics processor 102 can perform image processing of captured images; indoor positioning sensors 103 can include a variety of sensors (e.g., camera vision based SLAM positioning system employing one or more monocular cameras, one or more stereoscopic camera, one or more laser depth sensors, one or more LIDAR devices, laser and/or ultrasonic rangefinders, an inertial sensor based positioning system, an RF/WIFI/Bluetooth triangulation based sensor system, or the like).

In some examples, the graphics processor 102 can include a graphics processing unit (GPU). In some examples, the graphics processing unit can include a graphics card (e.g., board that incorporates the graphics processing unit). In some examples, the graphics card can be integrated into a computing system of the autonomous drone 100.

In some examples, the graphics processor 102 can accelerate real-time 3D graphics applications. For example, the graphics processor 102 can accelerate real-time 3D graphics for the machine-learned models of an autonomous drone 100. In some examples, the graphics processor 102 can process sensor data 115 captured by an autonomous drone 100 as it flies throughout a warehouse.

Optical sensors 104 can detect inventory identifiers (e.g., inventory barcodes) and implement optical character recognition (OCR), machine learning, computer vision, or any other image processing algorithm(s)), any combination thereof. In some examples, optical sensors 104 can be electronic detectors that convert or change light into an electric signal. For example, optical sensors 104 can utilize electric signals to identify inventory items through obtaining an image of a barcode. In some examples, optical sensors 104 can be integrated into a camera 106. In other examples, optical sensors 104 can be a standalone sensor.

Additional sensors 105 can include a variety of sensors (e.g. temperature sensors, inertial sensors, altitude detectors, LIDAR devices, laser depth sensors, radar/sonar devices, wireless receivers/transceivers, RFID detectors, etc.).

In some examples, cameras 106 can include a varied field of view. In some examples, a wider field of view camera 106 can observe more of the surrounding environment. In some examples, a narrower field of view camera 106 can observe less of the surrounding environment. In other examples, the camera lens, focal length, and sensor size can determine the field of view for the camera 106. In some examples, the field of view for a camera 106 can be static (e.g., does not change). In other examples, the field of view for a camera 106 can be dynamic (e.g., can be automatically adjusted).

Cameras 106 can collect wide field of view and narrow field of view images for processing. In the example autonomous drone 100, the sensor suite 101 can obtain any sensor data 115 that describes the surrounding warehouse environment of the autonomous drone 100. The computing resources of the sensor suite 101 can be shared among its subsystems, or a subsystem can have a set of dedicated computing resources.

The example autonomous drone 100 may include an autonomy system 107 which can include different subsystems for performing various autonomy operations. The autonomy operations can include perceiving the surrounding environment of the autonomous drone 100 and autonomously planning the drone's motion through the environment, without manual human input. The subsystems of the autonomy system 107 can include a drone localization system 108, flight planning system 109, and drone control system 110.

The autonomy system 107 can be implemented by one or more onboard computing devices. This can include one or more processors and one or more memory devices. The one or more memory devices can store instructions executable by the one or more processors to cause the one or more processors to perform operations or functions associated with the subsystems. The computing resources of the autonomy system 107 can be shared among its subsystems, or a subsystem can have a set of dedicated computing resources.

The drone localization system 108 can determine the location of the autonomous drone 100 within the warehouse environment. In some examples, the localization system 108 of the autonomous drone 100 can pinpoint its exact location within the warehouse environment based on determining the location of an object in the immediate vicinity of the autonomous drone 100. In some examples, the localization system 108 can determine the location of the autonomous drone 100 by comparing the distance of the autonomous drone 100 from an object identified in the surrounding warehouse environment.

The flight planning system 109 can determine a trajectory for the autonomous drone 100. A flight plan can include one or more trajectories (e.g., flight trajectories) that indicate a path for the autonomous drone 100 to follow. A trajectory can be of a certain length or time range. The length or time range can be defined by the computational planning horizon of the flight planning system 109. A trajectory can be defined by one or more waypoints (with associated coordinates). The way points(s) can be future locations(s) for the autonomous drone 100. The flight plans can be continuously generated, updated, and considered by the autonomy system 107.

The drone control system 110 can translate the trajectory into vehicle controls for controlling the autonomous drone 100. For example, the autonomous drone 100 may include control devices 111 which can include different subsystems for performing various flight control operations. The subsystems may include flight controllers 112, motors 113, and propellers 114.

In some examples, the drone control system 110 can translate the trajectory into electrical signals. In some examples, the control devices 111 can receive the electrical signals from the drone control system 110. The control devices 111 can be configured to implement the translated controls (e.g., electrical signals) from the drone control system 110. The flight controller 112 can implement operations to drive the motors 113 and propellers 114. In some examples, the autonomy system 107 can output instructions that can be received by the control devices 111. In some examples, the control devices 111 can translate the instructions into control signals to control the flight controllers 112, motors 113, and propellers 114.

Mission data 116 can be transferred to and from the autonomous drone 100 with data and instructions for warehouse inventorying. Mission data 116 can be processed by the autonomous drone 100 and its subsystems as input to the autonomous drone 100 for autonomous flight operations and the warehouse inventory management process. Example mission data 116 can include instructions for the autonomous drone 100 to count inventory items stored within the warehouse.

As further described, the autonomous drone 100 can obtain sensor data 115 through the sensor suite 101 and utilize its autonomy system 107 to detect objects and plan its flight plan to navigate through the warehouse environment. The autonomy system 107 can generate control outputs for controlling the autonomous drone 100 (e.g., through drone control systems 110, control devices 111, etc.) based on sensor data 115, mission data 116, or other data.

Figure 2:
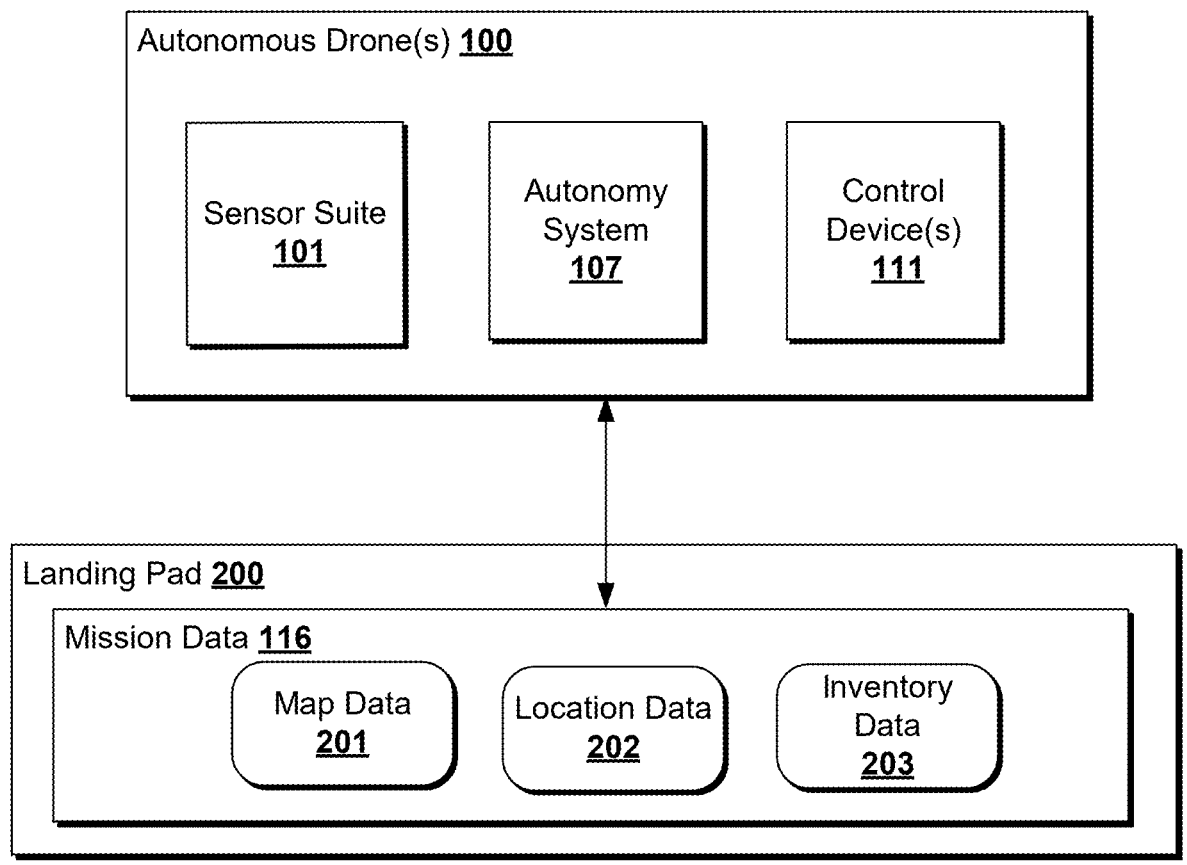
FIG. 2 is a block diagram of an example computing ecosystem of an autonomous drone and a landing pad, according to some implementations of the present disclosure.

FIG. 2 is a block diagram of an example computing ecosystem for an example autonomous drone and an example landing pad, according to some implementations of the present disclosure. As further described herein, the autonomous drone 100 can receive or transmit mission data 116 which include data and instructions for autonomous flight operations and the warehouse inventory management process. The mission data 116 can be received or transmitted from a landing pad 200. Landing pads 200 can be a landing surface for an autonomous drone 100 positioned within the warehouse environment.

The example landing pad 200 can be any landing surface suitable for supporting an autonomous drone 100. In some examples, the landing pad 200 is affixed to an inventory shelving unit. In some examples, the landing pad 200 is affixed to other warehouse infrastructure. The landing pad 200 can be configured to provide charging power to the autonomous drone 100 while the autonomous drone 100 is docked on the landing pad 200. In some examples, the landing pad 200 can provide an accommodating physical shape to one or more portions of autonomous drone 100 to allow for easier landing and docking. In other examples, the landing pad 200 can include visual identifiers to allow for easier detection of the landing pad 200 by an autonomous drone 100.

In an example, mission data 116 can be received or transmitted between the autonomous drone 100 and landing pad 200. For example, when a new inventory mission has been generated, the landing pad 200 can transmit mission data 116 to an autonomous drone 100 that is docked on the landing pad 200. In some examples, an autonomous drone 100 that has completed an inventory mission can dock on a landing pad 200 and transmit updated mission data 116 (e.g., indicating inventory items that were counted) to the landing pad 200, as will be further described herein. In some examples, an autonomous drone 100 can dock on a landing pad 200 prior to completing an inventory mission and transmit updated mission data 116 to the landing pad 200.

Mission data 116 can include different types of datasets associated with warehouse inventorying. The datasets can include map data 201, location data 202, inventory data 203. The map data 201 can include a dimensional (e.g., 2D, 3D, 4D, etc.) layout of the warehouse environment. In some examples, the map data 201 can be generated by manually mapping the layout of the warehouse using LiDAR and camera sensors. In some examples, map data 201 can be generated by manually flying a drone throughout the warehouse environment. In some examples, the map data 201 can be generated by processing a facility map of the warehouse which includes dimensional measurements of the warehouse and warehouse infrastructure. Warehouse infrastructure can include any stationary or mobile object within a warehouse. In some examples warehouse infrastructure can include inventory shelving units, large ceiling fans, cranes or hoists, integrated dock levelers, work benches, etc.

In some examples, map data 201 can include information indicative of one or more obstacles within the warehouse environment. For example, the map data 201 may encode the locations of one or more obstacles. This information may be included as an "obstacle map". An obstacle map can include known or perceived obstacles which can disrupt a flight plan for an autonomous drone 100. Obstacles can include pallets, utility carts or dollies, totes, bins, etc.

In some examples, the obstacle map can be generated by manually mapping the layout of the warehouse using LiDAR, camera, or other sensors. In some examples, the obstacle map can be generated by processing a facility map of the warehouse which includes dimensional measurements of warehouse infrastructure. In some examples, an obstacle map can be updated by an autonomous drone 100 that perceived the obstacle during an inventory mission. In other examples, an obstacle map can be updated by an autonomous drone 100 that perceived a removed obstacle.

Location data 202 can include a current location of the landing pad 200. In some examples, the autonomous drone 100 can be docked on a landing pad 200. For example, when the autonomous drone 100 is docked on a landing pad 200, mission data 116 can be transmitted between the autonomous drone 100 and landing pad 200 upon contact. In some examples, the landing pad 200 can charge the autonomous drone 100 while mission data 116 is being transmitted. In some example implementations, when an autonomous drone 100 comes online, and upon initializing sensors, location data 202 can be transmitted to the autonomous drone 100 to provide a current location of the autonomous drone 100. In some example implementations, the current location of the autonomous drone 100 is the location of the landing pad 200 within the warehouse environment.

In some examples, the location data 202 can include the region (e.g., slots, etc.) of the warehouse where inventory items are located. For example, the location data 202 can include the location of a set of slots or inventory shelving units where inventory items are located. As used herein, "slot" can refer to an area or volume defined by two or more dimensions. In some examples, the location data 202 can be an associated location on a dimensional layout of the warehouse. In some example implementations, the location data 202 can include map data 201. In other examples, location data 202 can include the location of obstacles within the warehouse environment.

Inventory data 203 can include relevant inventory items to be counted by the autonomous drone 100. For example, inventory data 203 can include a list of inventory items expected to be within the warehouse. In some implementations, inventory data 203 can include data indicative of where an inventory item is expected to be located in a specific slot or inventory shelving unit. In some examples, the inventory data 203 can be a database table including a plurality of rows and columns. In some examples, the database table can include the slot on the inventory shelving unit where the inventory item should be located, a description of the inventory item, the barcode identifier, etc., in the columns and rows. In some examples, the database table can be compressed. In other examples, the database table can be updated as new inventory data (e.g., inventory items leave or enter the warehouse) is generated.

In other examples, inventory data 203 can include a list of missing inventory items. Missing inventory items can include inventory items which cannot be found by the autonomous drone 100 in their expected location or which have not been counted. In some examples, missing inventory items may have already left the warehouse. In other examples, missing inventory items may be lost.

In an embodiment, sensor data 115 may be transmitted to the landing pad 200. For instance, the autonomous drone 100 may receive mission data 116 instructing the autonomous drone 100 to initiate a flight plan to capture sensor data 115 of a plurality of slots in region of the warehouse to facilitate the counting of inventory items in the region. In an embodiment, the sensor data 115 may be captured and transmitted to the landing pad 200 for offline processing. An example of processing sensor data 115 to count inventory items is further described with reference to FIGS. 4-5.

In an embodiment, inventory data 203 can include map data 201 and location data 202. In other examples, missing inventory items can be included in map data 201. In some examples, missing inventory items can update inventory data 203. In some examples, missing inventory items can update location data 202.

Inventory data 203 can be generated by a warehouse inventory management software. For example, warehouse employees can update an inventory management software with current inventory items. In some examples, the inventory management software can track the volume and location of inventory items within the warehouse. In some examples, the inventory management software can be updated as inventory items enter and leave the warehouse. In some examples, inventory data 203 can synchronize with the inventory management software to maintain accurate inventory levels. In other examples, inventory data 203 can update the inventory levels in the inventory management software.

Inventory data 203 can be updated by an autonomous drone 100. For example, as the autonomous drone 100 moves (e.g., flies, drives on the ground) throughout the warehouse to scan inventory, inventory items may be counted to maintain an updated record of inventory items in the warehouse at any point in time. When inventory items are not found, inventory data 203 can be updated to reflect the current stock levels of current inventory within the warehouse. In some examples, inventory items may be located in a different location than the inventory data 203. When inventory items are scanned in a different location than the inventory data 203, the inventory data 203 can be updated to reflect the current location of the inventory items. In some examples, an inventory management system can be updated by the inventory data 203.

In some examples, inventory data 203 can be updated to reflect misscanned inventory. Misscanned inventory can include inventory items which have an unreadable or obscure barcode. In some examples, inventory data 203 can include a count and location of miscanned inventory. In some examples, an inventory management system can be updated by the inventory data 203. In some implementations, inventory data 203 can be updated to reflect misslots. Misslots can include inventory located in a different location (e.g., slot) than what was indicated in the inventory data 203. In some examples, a misslot can include inventory items in the wrong location (e.g., slot).

As further described herein, the autonomous drone 100 and landing pad 200 can exchange mission data before, during, and after an autonomous drone 100 has completed its inventory mission. In some examples, a warehouse can utilize multiple autonomous drones 100 and multiple landing pads 200 to count an entire warehouse. In some examples, multiple autonomous drones 100 can utilize different or multiple landing pads 200 to complete its inventory mission. In some examples, multiple autonomous drones 100 can utilize the same landing pad 200.

Figure 3:
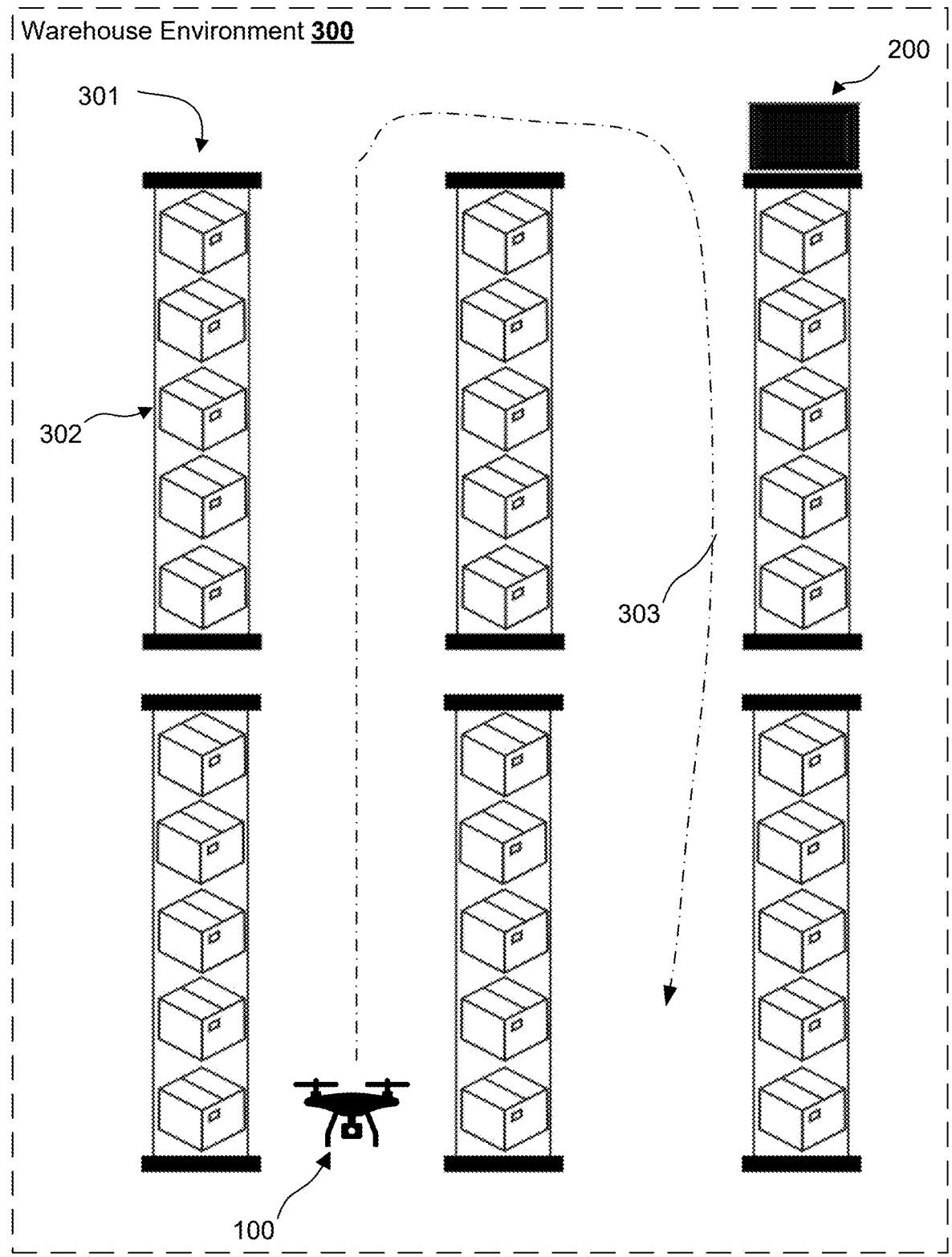
FIG. 3 is a representation of an example autonomous drone flight plan through a warehouse environment, according to some implementations of the present disclosure.

FIG. 3 is a representation of an example autonomous drone flight plan through a warehouse environment 300, according to some implementations of the present disclosure. As further described herein, the autonomous drone 100 can navigate the warehouse environment 300 to count inventory items 302. A warehouse environment 300 can be any building or structure where manufactured goods or raw materials may be stored. In some examples, the warehouse environment 300 may include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas suitable for storage of manufactured goods or raw materials (e.g., supply chain port, lumber yards, etc.).

The warehouse environment 300 may include inventory shelving units 301 (e.g., inventory storage racks) which include a plurality of slots for storing the inventory items 302. The inventory shelving units 301 may be positioned in a predictable and repeatable pattern throughout the warehouse environment 300. In some examples, the inventory shelving units 301 can be positioned in rows. In other examples, the inventory shelving units 301 can be positioned adjacent to each other. In some examples the inventory shelving units 301 can be stacked on each other. In some examples, the inventory shelving units 301 can be positioned to allow for people or autonomous drones 100 to navigate the warehouse environment 300.

The inventory shelving units 301 can be of standard warehouse rack size or of custom size. In some examples, the inventory shelving units 301 can be 8-feet, 10-feet, 12-feet, 16-feet, and 20-feet upright. In other examples, the inventory shelving units 301 can be of a custom size (e.g., 11-feet, 11.5-feet, etc.). In some examples, the inventory shelving units 301 can be based on the measure and height of inventory pallets. In other examples, the inventory shelving units 301 can be based on the racking beam size.

The inventory shelving units 301 can store warehouse inventory items 302 in slots on its shelves. An inventory item 302 can be any manufactured product or raw material which is being stored in the warehouse environment 300. For example, inventory items 302 can include boxes which contain a manufactured good or raw material. In some examples, inventory items 302 can include other packaged or wrapped (e.g., storage wrapped) items. In some examples, inventory items 302 can include bins or totes that store a manufactured good or raw material. In other examples, inventory items 302 may not be packaged in any box, wrapping or storage material. In some examples, inventory items 302 include an identifier (e.g., barcode).

Inventory items 302 can be stored directly in slots on an inventory shelving unit 301 or on pallets. For example, inventory items 302 may be tightly coupled with other similar items and stored on an inventory pallet for easy storage and retrieval. In some examples, inventory pallets may be stored on inventory shelving units 301. In other examples, inventory pallets may be stored on the floor of the warehouse environment 300. For instance, inventory pallets that are stored on the warehouse floor may be identified as an obstacle for an autonomous drone 100. In some examples, inventory pallets stored on the warehouse floor may be captured in a warehouse dimensional layout.

In some examples, inventory items 302 may be bulk items. Bulk items may include objects which are too large to fit on an inventory shelving unit 301. Example bulk items may include large appliances, heavy equipment, or other bulky items. The bulk objects may also be stored in designated slots on the floor of the warehouse environment 300 and may be counted in a similar manner to other inventory items 302 stored in slots on inventory shelving units 301. An example of bulk items is further described with reference to FIG. 8.

In the example warehouse environment 300, inventory shelving units 301 can support landing pads 200. In some examples, the landing pads 200 can be affixed to an end of the inventory shelving unit 301. For example, landing pads 200 affixed to an end of the inventory shelving unit 301 allow for more takeoff and landing space for an autonomous drone 100. In some examples, the landing pad 200 is affixed towards the top level of the inventory shelving unit 301. For example, affixing the landing pad 200 towards the top level of the inventory shelving unit 301 can ensure that people or warehouse machinery do not collide with the autonomous drone 100 or landing pad 200.

The example autonomous drone 100 can execute a flight plan 303 to navigate the warehouse environment 300. For example, when an autonomous drone 100 receives mission data 116, the autonomous drone 100 can determine a flight plan 303 to execute the inventory mission. In some examples, a flight plan 303 can be determined based on the mission data 116. In some examples, the flight plan 303 can be generated by the autonomous drone 100. In other examples, the flight plan 303 can be generated remotely. In some examples, the flight plan 303 can be transmitted from the landing pad 200.

The flight plan 303 can be updated as the autonomous drone 100 flies throughout the warehouse environment 300. For example, the autonomous drone 100 can encounter an obstacle as it executes its inventory mission. In some examples, the autonomous drone 100 can execute active avoidance to avoid the obstacle. Active avoidance can include avoidance maneuvers executed by the autonomous drone 100 to avoid obstacles. In some examples, active avoidance can prevent the autonomous drone 100 from colliding with an object in the warehouse environment 300. In some examples, the autonomous drone 100 can generate an updated flight plan 303 to complete its inventory mission following the avoidance of an obstacle. In some examples, a flight plan 303 can account for known obstacles in the warehouse environment 300.

The flight plan 303 can optimize the travel time and distance for an autonomous drone 100. For instance, the autonomous drone 100 can utilize the flight planning system 109 to generate the most efficient flight plan 303 for the autonomous drone 100 to execute its inventory mission. In some examples, the autonomous drone 100 can utilize sensor data 115 perceived by the autonomous drone 100 to determine the most efficient flight plan 303. In some examples, the autonomous drone 100 can utilize mission data 116 to determine the most efficient flight plan 303. In other examples, the autonomous drone 100 can utilize both sensor data 115 and mission data 116 to generate and optimize the flight plan 303.

As further described herein, the autonomous drone 100 can traverse the warehouse environment 300 to scan inventory items 302 stored on inventory shelving units 301 by executing a motion plan (e.g., flight plan 303) and docking on a landing pad 200. In some examples, multiple autonomous drones 100 can traverse the warehouse environment 300 by executing respective motion plans (e.g., flight plans 303) concurrently.

Figure 4:
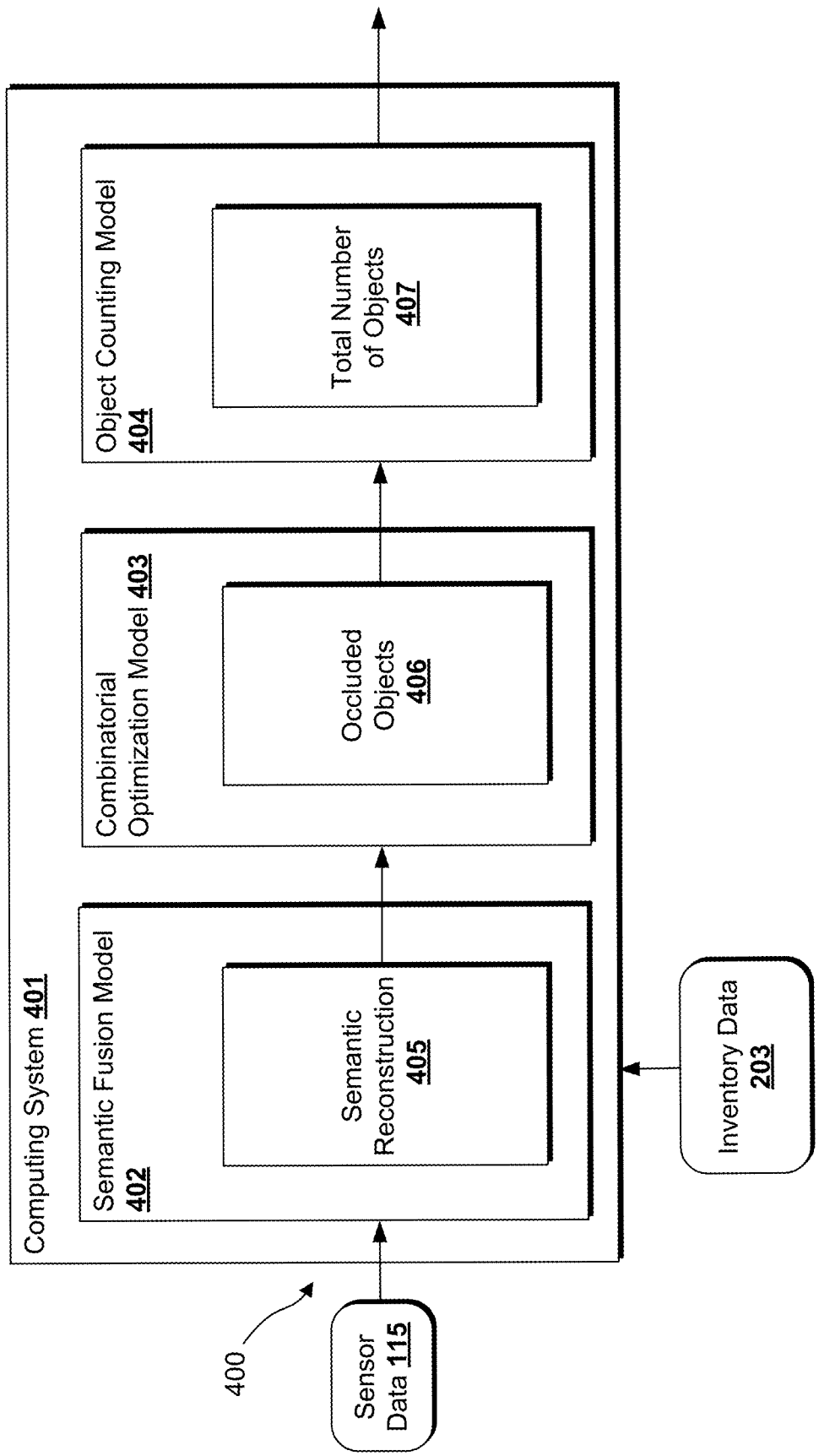
FIG. 4 depicts an example dataflow pipeline, according to some implementations of the present disclosure.

FIG. 4 depicts an example dataflow pipeline, according to some implementations of the present disclosure. The example dataflow pipeline 400 is described with an example implementation in which a computing system 401 receives sensor data 115 and processes the sensor data 115 using a machine-learned semantic fusion model 402 to generate a semantic reconstruction 405 of the warehouse environment 300, a machine-learned combinatorial optimization model 403 to analyze the semantic reconstruction 405 to determine occluded objects, and a machine-learned object counting model 404 to determine a total number objects 407 depicted in the sensor data 115. In an embodiment, inventory data 203 may be accessed by the computing system 401 to determine an anticipated location of a slot within the warehouse environment 300.

The computing system 401 may be a subsystem of the autonomous drone 100, the landing pad 200, a remote computing system, or any combination therein. The computing system 401 may be implemented by one or more computing devices. For example, the computing system 401 may include one or more processors and one or more memory devices. The one or more memory devices may store instructions executable by the one or more processors to cause the one or more processors to perform operations or functions associated with other systems or components such as the autonomous drone 100, landing pad 200, etc. The computing system 401 may include a number of systems and components for performing various operations. For example, computing system 401 may include a machine-learned semantic fusion model 402, combinatorial optimization model 403, and an object counting model 404.

The semantic fusion model 402 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The semantic fusion model 402 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include labelled sensor data inputs that have labeled slots, inventory items 302, bulk items, etc. In some examples, the training data may include simulated training data (e.g., training data obtained from simulated scenarios, inputs, configurations, various warehouse settings, etc.).

Additionally, or alternatively, the model trainer(s) may perform unsupervised training techniques using unlabeled training data. By way of example, the model trainer(s) may train one or more components of a machine-learned model to perform slot detection and object detection through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

The semantic fusion model 402 may receive the sensor data 115 and generate a semantic reconstruction 405 of the depicted warehouse environment 300. For instance, the autonomous drone 100, during a flight plan 303 may capture sensor data 115 including a plurality of image frames across one or more inventory shelving units 301 within the warehouse environment 300. The semantic fusion model 402 may analyze the image frames to detect one or more slots depicted in the image frames. The slots may include a storage location of inventory items 302. For instance, the slots may include a defined volume of space where a plurality of inventory items 302 (e.g., objects) are stored. The objects may be stacked directly on the inventory shelving unit 301, on a pallet, the floor of the warehouse environment 300 or otherwise contained within a slot.

In an embodiment, the semantic fusion model 402 may perform image segmentation techniques to segment respective slots of a plurality of slots included in the sensor data 115. For instance, the semantic fusion model 402 may determine a cluster of objects depicted in the sensor data 115 is associated with a slot and segment the image frame to encapsulate the outer boundaries of the slot.

In some embodiments, the semantic fusion model 402 may access inventory data 203 indicating the anticipated location of slots throughout the warehouse environment 300. For instance, based on inventory data 203 indicating the respective locations of slots and the sensor data 115 depicting a respective portion of the warehouse environment, the semantic fusion model 402 may identify respective slots depicted in the sensor data 115.

The semantic fusion model 402 may analyze the plurality of image frames and extract dimensional information for each of the slots depicted in the sensor data 115. For instance, the semantic fusion model 402 may analyze a first image frame depicting a slot containing a plurality of inventory items 302 bound together on a pallet. The semantic fusion model 402 may determine the dimensional shape and size (e.g., outermost boundaries) of the slot. Based on the dimensional information, the semantic fusion model 402 may generate a semantic reconstruction 405 of the slot.

The semantic reconstruction 405 may be a three dimensional representation of the slot depicted in the sensor data 115. For instance, the semantic fusion model 402 may determine the three dimensional volume of the slot and extract the dimensional data to generate the semantic reconstruction 405 as a three dimensional representation of the slot. In an embodiment, the semantic reconstruction 405 may enable the computing system to mathematically represent the slot. By way of example, once the semantic fusion model 402 has determined the dimensional measurements of the slot, the semantic reconstruction 405 may be generated which represents a slot matching the dimensional measurements of the slot depicted in the sensor data 115.

Based on the constraints provided by the extracted volume of the slot, the computing system 401 may be able to determine the volume of visible and partially occluded objects (e.g., inventory items 302) to "fit" into the volume of the slot within the semantic reconstruction 405. Fitting the visible and partially occluded objects into the volume of the slot may include reducing the available volume of the semantic representation of the slot (e.g., in the semantic reconstruction 405) to include representations of the visible and partially occluded objects.

To do so, the semantic fusion model 402 may classify objects as visible objects or partially occluded objects. Classifying the objects may include generating labels or other annotation techniques which allow the semantic fusion model 402 to concatenate objects across multiple sensor data 115 inputs. For instance, the semantic fusion model 402 may generate the semantic reconstruction 405 and iteratively update the semantic reconstruction 405 based on additional sensor data 115 provided to the computing system 401. The additional sensor data 115 may be requested by the computing system 401, by way of mission data 116 transmitted to the autonomous drone 100 or other sensor data capturing means to acquire sensor data 115 of a specific region of the warehouse environment 300. In some embodiments, additional sensor data 115 may be passively captured by an autonomous drone 100 or other sensor data capturing means.

By way of example, a first image frame at a first time stamp may be processed by the semantic fusion model 402 and a semantic reconstruction 405 of a first slot may be generated. The semantic reconstruction 405 may include a dimensional representation of a slot that includes a stack of inventory items 302 stacked at least seven boxes high. For instance, the semantic reconstruction 405 may generate a representation of the slot that includes a seven foot height, and an eight foot width based on the stack of boxes contained therein. The stack of boxes may be classified (e.g., labeled, color coded, etc.) as visible objects based on being visible in the sensor data 115. Moreover, the semantic reconstruction 405 may determine the depth of the slot to be six feet based on the full depth of the inventory shelving unit 301 being visible in the sensor data 115. However, due to the forward angle of the first image frame, inventory items 302 stacked directly behind seven stacked boxes may not be visible. In an embodiment, the visible objects may be labeled with a unique identifier or color coded such that the visible objects may be detected in subsequent image frames.

For example, the semantic fusion model 402 may receive a second image frame of the slot. The second image frame may include an image of the slot from a top view and based on the top view, the semantic fusion model 402 may extract additional dimensional data indicating the stack of seven boxes are stacked six boxes deep and update the semantic reconstruction 405 to include the additional information. In an embodiment, the semantic fusion model 402 may stitch together the first image frame and the second image frame and utilize the labels to distinguish each of the seven stacked boxes from the first image frame from the additional boxes included in the second image frame.

In an embodiment, some of the objects depicted in the first image frame or the second image frame may be partially occluded. For instance, a clear view of all dimensions of the object may be partially occluded from view due to being stacked on other objects, being bound together by wrapping, or other obstructions. Objects which are partially occluded may be labeled as such indicating that a full dimensional representation cannot be generated based on the sensor data 115. In this manner, the semantic reconstruction 405 may be a four dimensional representation of the slot depicting the a three dimensional representation of the slot over time as additional sensor data 115 is received.

Once the semantic fusion model 402 has generated and/or updated the semantic reconstruction 405 based on the sensor data 115, and the objects visible or partially occluded have been labeled, the combinatorial optimization model 403 may "fit" the visible objects and partially occluded objects into the volume of the slot using cuboids and the semantic reconstruction 405.

For instance, the combinatorial optimization model 403 may determine a cuboid to represent each of the label objects (e.g., visible, partially occluded, etc.). The cuboid may include a three-dimensional shape such as a hexahedron with quadrilateral faces that represents the extracted dimensions of the visible and partially occluded objects. While examples herein describe cuboids, the present disclosure is not limited to such embodiment and any three dimensional shapes may be used.

The combinatorial optimization model 403 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The combinatorial optimization model 403 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include training cuboids, training semantic reconstructions 405, etc. In some examples, the training data may include simulated training data (e.g., training data obtained from simulated scenarios, inputs, configurations, various warehouse settings, etc.).

Additionally, or alternatively, the model trainer(s) may perform unsupervised training techniques using unlabeled training data. By way of example, the model trainer(s) may train one or more components of a machine-learned model to perform cuboid selection through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

By way of example, the combinatorial optimization model 403 may receive the semantic reconstruction 405 which include a dimensional representation of the slot. The dimensional representation may provide a set of constraints for applying mathematical algorithms to determine the number of occluded objects 406 that may be included in the volume of the slot. For instance, semantic reconstruction 405 may include a seven foot high, eight foot wide, and six foot deep slot representation of the slot.

As an example, based on the dimensional data extracted from the sensor data 115, the combinatorial optimization model 403 may determine a one foot high cuboid for each of the seven stacked boxes which fill the front portion of the slot (e.g., which is seven feet high). As another example, the combinatorial optimization model 403 may determine the cuboid of the seven stacked boxes is about two feet in width based on the seven stacked boxes filling only twenty-five percent of the width of the slot. The combinatorial optimization model 403 may perform continuous rotations, translations, and allowable distances within the three-dimensional size of the slot to determine a cuboid that fits each of the visible and partially occluded objects.

Once cuboids have been fit into the volume of the slot, the combinatorial optimization model 403 may determine additional volume of the slot is unaccounted for in the mathematical calculations. For instance, based on the first image frame and the second image frame, the semantic reconstruction 405 may represent the slot as about 10 m$^3$ based on the depicted dimensional measurements. Based on the visible and partially occluded cuboid fit into the volume of the slot, the combinatorial optimization model 403 may determine that additional objects may be included in the slot.

In an embodiment, the combinatorial optimization model 403 may employ one or more algorithms to determine occluded objects that may be included in the slot. By way of example, the combinatorial optimization model 403 may employ a "packing problem" algorithm to determine the occluded objects contained in the slot. The "packing problem" may apply algorithmic formulas to identify a minimum number of objects that fill the remaining unaccounted for volume of the slot by determining a cuboid of minimum size under continuous rotations, translations, and allowable distances within the three-dimensional size of the slot. This may include applying a set of physics rules to further narrow the number and size of cuboids which may fill the remaining unaccounted for volume. For instance, based on the cuboids associated with the visible and partially occluded objects, the combinatorial optimization model 403 may determine a number cuboids of similar size will satisfy the constraints of the unaccounted for volume. Moreover, the combinatorial optimization model 403 may determine only cuboids of differing sizes or quantities may satisfy the constraints of the unaccounted for volume.

Based on determining a number of cuboids that fit in the unaccounted volume of the slot in the semantic reconstruction 405, the combinatorial optimization model 403 may determine the number of occluded objects 406 and update the semantic reconstruction 405 to include cuboids representing occluded objects that are not visible or otherwise depicted in the sensor data 115. In an embodiment, the combinatorial optimization model 403 may iteratively increase the accuracy of occluded objects 406 overtime. For instance, the combinatorial optimization model 403 may be trained locally in a specific warehouse environment 300 which inventory items 302 are stacked or arranged in slots in a pattern or otherwise repetitive manner. Based on the storage techniques of the specific warehouse environment 300, the combinatorial optimization model 403 may learn to determine the occluded objects 406 more efficiently over time.

Once the combinatorial optimization model 403 has updated the semantic reconstruction 405, the object counting model 404 may analyze the semantic reconstruction 405 including the occluded objects 406 and count each of the cuboid (e.g., associated with the visible object, partially occluded objects, and occluded objects 406) which fill the volume of the slot to determine the total number of objects 407.

The object counting model 404 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models.

Example neural networks include feed-forward neural networks, recurrent neural networks (e.g., long short-term memory recurrent neural networks), convolutional neural networks, or other forms of neural networks.

The object counting model 404 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include training cuboids, training semantic reconstructions 405, etc. In some examples, the training data may include simulated training data (e.g., training data obtained from simulated scenarios, inputs, configurations, various warehouse settings, etc.).

For example, the object counting model 404 may analyze the semantic reconstruction 405 to determine the total number of objects 407. In some embodiments, the object counting model 404 may validate the cuboid selections for the visible objects, partially occluded objects, and the occluded objects 406. For instance, the object counting model 404 may compare the total number of cuboids detected in the semantic reconstruction with the inventory data 203.

In some embodiments, if the total number of cuboids exceeds the total number of inventory items 302 assigned to the specific slot by a threshold number, the object counting model 404 may determine the cuboid selections to be inaccurate and provide a feedback loop to the semantic fusion model 402 and/or the combinatorial optimization model 403 to regenerate the or update the semantic reconstruction 405 or the cuboid selections. In another embodiment, the object counting model 404 may be configured to analyze the sensor data 115 to determine whether the cuboid count is accurate. For instance, the sensor data 115 may depict a single bulk object located in a floor or ground slot on the floor of the warehouse environment. Based on only a single detected object in the sensor data 115, the object counting model 404 may determine a cuboid count of greater than one to be inaccurate and provide feedback to the semantic fusion model 402 and/or the combinatorial optimization model 403.

Once the object counting model 404 has counted the cuboids depicted in the semantic reconstruction 405 and validated the total number of objects 407, the object counting model 404 may output the total number of objects 407 to a remote computing system such as an inventory management system to update the inventory of the warehouse in real time.

In an embodiment, in response to generating the semantic reconstruction 402, the combinatorial optimization model 403 may generate a volumetric-based estimate of item counts in a slot based on inventory data 203. For instance, the combinatorial optimization model 403 may access inventory data 203 indicating a number of objects assigned to a particular slot. Based on the inventory data and the cuboids that have been fit into the volume of the slot, the combinatorial optimization model 403 may compare the additional volume (e.g., unaccounted for volume) of the slot with a total number of objects assigned to the slot as indicated by the inventory data 203.

Based on the comparison, the combinatorial optimization model 403 may generate a volumetric-based estimate of the total number of objects 407. For instance, the combinatorial optimization model 403 may determine a volumetric based estimate which indicates that the unaccounted for volume of the slot is large enough to store remaining or unaccounted for objects that are assigned to the slot. In some implementations, the combinatorial optimization model 403 may determine a number of cuboids (e.g., of appropriate size) to fit the unaccounted volume which match the number of objects assigned to the slot as indicated by the inventory data 203. In this manner, the computing system 401 may more efficiently estimate the total number of objects 407.

In another embodiment, the computing system 401 may utilize a vision language model (VLM) (not shown) to determine a total number of objects 407 without a semantic reconstruction 405. For instance, the computing system 401 may employ a VLM trained to detect objects on-board the autonomous drone 100. The VLM may process the sensor data 115 and utilize the inventory data 203 to determine a number of occluded objects 406. For instance, the VLM may be trained to detect visible objects within a slot and compare the visible objects with a number of assigned objects to a slot as indicated by the inventory data 203.

Based on the visible objects and the inventory data 203, the combinatorial optimization model 403 may analyze the sensor data 115 to rectify the difference between the visible objects and the objects assigned to the slot. For instance, the combinatorial optimization model 403 may include a visual encoder for understanding and evaluating occluded objects. The unaccounted for volume within a slot and predict a number of occluded objects 406 based on the spatial reasoning. For instance, the number of assigned objects to a slot indicated by inventory data 203 may provide a constraint for spatial reasoning. In an embodiment, the object counting model 407 may determine the total number of objects 407 based on the sensor data 115 and spatial reasoning estimates.

Figure 5:
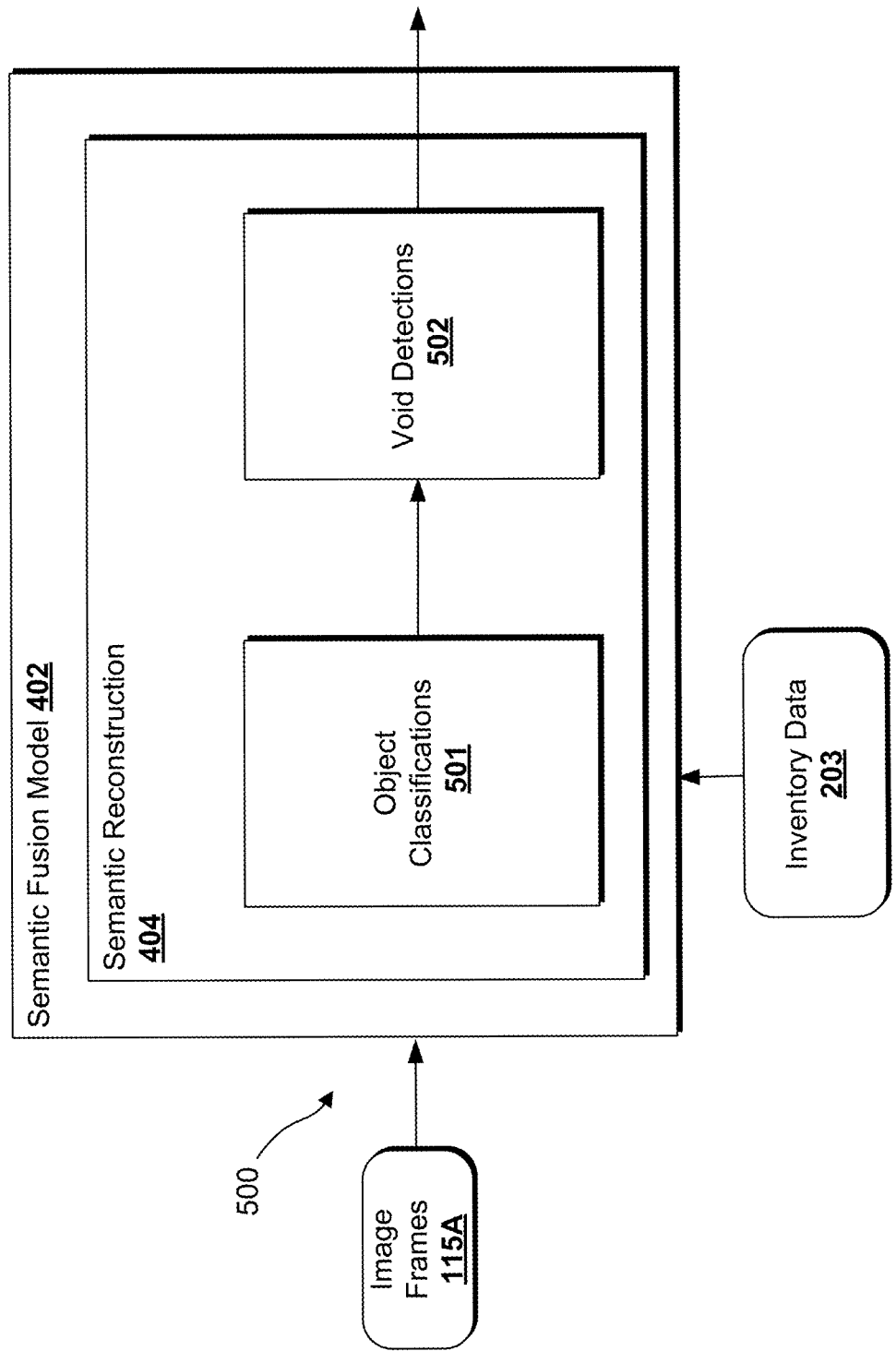
FIG. 5 depicts an example dataflow pipeline, according to some implementations of the present disclosure.

FIG. 5 depicts an example dataflow pipeline, according to some implementations of the present disclosure. The example dataflow pipeline 500 is described with an example implementation in which the semantic fusion model 402 receives image frames 115A and determines void detections 502 in slots in the semantic reconstruction 405 based on object classifications 501. In an embodiment, inventory data 203 may be accessed by the semantic fusion model 402 to determine void detections 502 in slots.

The image frames 115A can be included in the sensor data 115 received from an autonomous drone 100 or any other sensor data capturing means. The image frames 115A may include a plurality images of a slot within the warehouse environment 300 from various angles. The image frames 115A may be processed by the semantic fusion model 402 to generate a semantic representation of the slot depicting the dimensions of the slot and objects contained therein. As described, in FIG. 4, the semantic fusion model 402 may classify objects depicted in the sensor data 115. For instance, the semantic fusion model 402 may generate object classifications 501 that classify objects as visible objects or partially occluded objects within the semantic reconstruction 405.

In an embodiment, the object classifications 501 may be used to quickly determine whether the semantic reconstruction 405 should be processed by the combinatorial optimization model 403. By way of example, the image frames 115A may include images of bulk objects stored on the floor of the warehouse environment 300. Based on analyzing the image frames 115A, the semantic fusion model 402 may identify the slot, the dimensions of the slot, and generate a semantic reconstruction 405 of the slot including a plurality of object classifications for each of the bulk objects depicted in the image frames 115A. In some embodiment, the objects classifications 501 may indicate that three large appliances are stacked on top of each other in the slot and each of the three appliances may be associated with an object classification 501 as a visible object.

The semantic fusion model 402 may generate a semantic reconstruction 405 concatenating each of the three appliances (e.g., bulk objects) with a cuboid indicating three-dimensional representations of each of the appliances within the slot. In an embodiment, the semantic fusion model 402 may determine based on all of the objects contained in the slot being associated with a visible object label that there are no additional voids in the slot and generate a null void detection 502 indicating all objects may be counted without processing the semantic reconstruction 405 by the combinatorial optimization model 403. For instance, the three cuboids may fill the entire slot such that there is no unaccounted volume in the slot. In this manner, the computing system 401 may preserve computing resources otherwise expended unnecessarily computing cuboids of zero volume.

In another embodiment, the semantic fusion model may determine based on the objects classifications 501 that there is unaccounted volume in the slot. For instance, a partially occluded object classification 501 may indicate that there is unaccounted volume in the slot, and the semantic fusion model 402 may generate a void detection 502 indicating a portion or region within the slot where volume is unaccounted for.

By way of example, the image frames 115A may include a plurality of images of a slot containing loose items bound together on a pallet. Due to being bound together using opaque materials, the image frames 115A may not fully depict any of the loose items. As such the semantic fusion model 402 may generate object classifications 501 indicating each of the loose items as partially occluded. The semantic fusion model 402 may determine, based on each of the objects classifications 501 being partially occluded a plurality of void detections 502 indicating unaccounted volume in the slot.

The void detections 502 may include labels or other indications within the semantic reconstruction 405 providing parameters of the one or more algorithms of the combinatorial optimization model 403. For instance, the void detections 502 may include the dimensions and positions of the void (e.g., unaccounted for volume) within the slot such that the void detections 502 may provide further constraints for the "packing problem". In an embodiment, the void detections 502 may be used to determine or validate cuboid selections for the objects within the slot.

For example, the void detections 502 may be used to determine cuboids for each of objects within the slot. Based on the void detections, any remaining unaccounted volume may be considered a void detection 502. Conversely, any void detection 502 may not be considered as being included in the volume of a cuboid. In this manner the void detections 502 may increase the confidence of the combinatorial optimization model 403 during the cuboid selection process. Once the combinatorial optimization model 403 determines the cuboids associated with the object classifications 501 and the void detections 502 associated with an occluded three-dimensional space within the slot, the number of occluded objects 406 may be determined.

In an embodiment, inventory data 203 may be used to determine void detections 502 in a slot. For instance, the semantic fusion model 402 may access inventory data 203 updated within a threshold time of a timestamp associated with the image frames 115A. Based on the inventory data, the semantic fusion model 402 may determine that, for example, a slot with ten visible object classifications 501 is incorrect based on the inventory data 203 recently indicating that the slot included fifty items. For instance, the ten items may be large boxes which include several items inside. Accordingly, notwithstanding that each item of the ten items are visible in the image frames 115A, the semantic fusion model 402 may determine that additional items which need to be counted are contained within the visible objects. As such the semantic fusion model 402 may generate void detections indicating that unaccounted volume exists within the ten objects.

Figure 6:
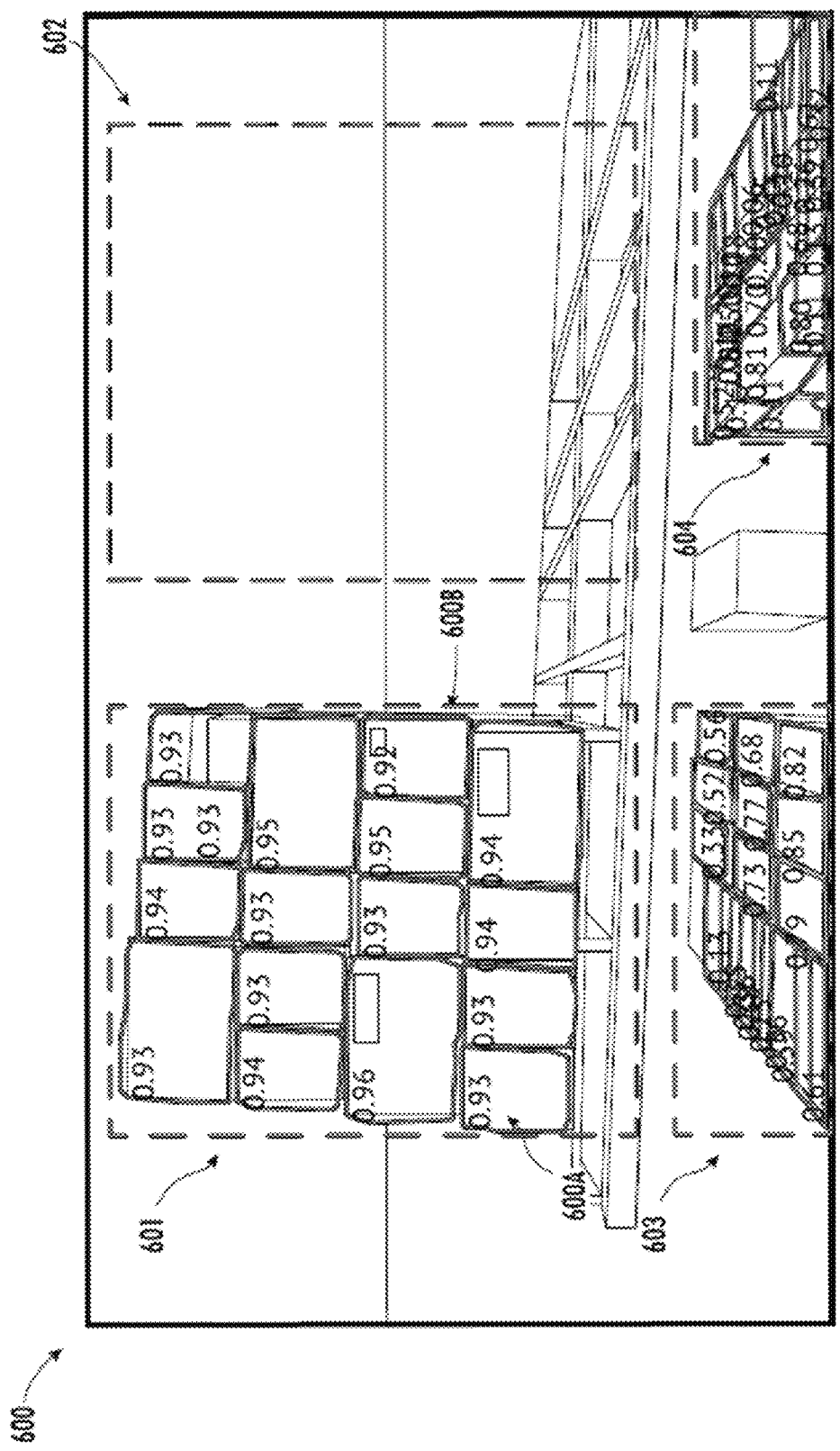
FIG. 6 depicts an example sensor data input, according to some implementations of the present disclosure.

FIG. 6 depicts an example sensor data input, according to some implementations of the present disclosure. For instance, the sensor data input 600 may include an image frame of a first slot 601, a second slot 602, a third slot 603, and a fourth slot 604 on an inventory shelving unit 301 within the warehouse environment 300. As depicted in the sensor data input 600, the first slot 601 and the second slot 602 may be an image frame from a front angle, while the third slot 603 and the fourth slot 604 may be an image frame from a top angle. The sensor data input 600 may be a single image frame or a plurality of image frames fused or stitched together.

The first slot 601 may include a plurality objects 600A-B stacked on top of each other. For instance, the first slot 601 includes objects 600A-B of different sizes stacked together on a pallet. The first slot 601, third slot 60 and fourth slot 604 depict bounding shapes for each of the objects 600A-B contained therein. The bounding shapes may be projected onto each object (e.g., objects 600A-B) contained in each slot during the object detection process.

The bounding shape can be any shape (e.g., a polygon) that includes an object within a slot depicted in sensor data 115. For example, as shown in FIG. 6, the bounding shape can include a square that encapsulates the objects 600A-B. One of ordinary skill in the art will understand that other shapes can be used such as circles, rectangles, etc. In some implementations, the bounding shape can include a shape that matches the outermost boundaries/perimeter of the objects 600A-B and the contours of those boundaries. The bounding shape can be generated on a per pixel level. The object characteristics (e.g., object classifications 501, etc.) can include the x, y, z coordinates of the bounding shape center, the length, width, and height of the bounding shape, etc.

The semantic fusion model 402 can generate data (e.g., labels) that correspond to the object classifications 501 of the bounding shape. Labels can include the type of object (e.g., bulk object, etc.), location of the object, orientation of the object within the slot, etc. In some examples, the labels that correspond to the bounding shape can include the dimensions of the objects.

In some examples, the semantic fusion model 402 can identify the location of the slot and generate a location label. The location label can be coordinates or a position on a dimensional layout of the warehouse environment 300. The location label can be a location relative to another object (e.g., other slots, objects, etc.) in the warehouse environment 300. The location label can be a location relative to a known location such as an exit or entry way. The location label can be any data that indicates a location or position on a dimensional layout in or in the warehouse environment 300.

In some embodiments, once processed by the computing system 401, the sensor data input 600 may include labels or other annotations indicating or other labels. For instance, as depicted in the first slot 601, third slot 603, and the fourth slot 604, the objects depicted in each slot may include labels indicating a level of visibility (e.g., or level of occlusion) of each object. For instance, objects which are clearly visible in the sensor data input 600 may include visibility levels close to a 1.0. Objects which are less visible may have a lower visibility level closer to 0.0. The visibility level may indicate a confidence level associated with the semantic fusion model's object classifications 501 for each of the detected objects. In an embodiments, the visibility levels may be used to further train the semantic fusion model 402 or other machine-learned models described herein.

In an embodiment, the sensor data input 600 may include empty slots such as, for example, the second slot 602. For instance, empty slots may include areas designated to store inventory items 302, but do not include any assigned items. In some embodiments, empty slots such as the second slot 602 may be segmented from the sensor data input 600. In other examples, empty slots may be compared to the inventory data 203 to determine the location or identify adjacent or close by slots that do contain objects.

In an embodiment, the sensor input data 600 may include unusable image frames 115A. For instance, the sensor input data 600 may be blurred by the movement of the autonomous drone 100 during flight, occluded by light reflections or poor lighting, occluded by a dirty imaging sensor (e.g., camera 106), etc. In some embodiments, once processed by the computing system 401, the computing system 401 may control the autonomous drone 100 to capture additional sensor data inputs 600. For instance, the computing system 401 may generate one or more command instructions to interact with the control devices 111 to cause the autonomous drone 100 to modify a flight plan 303 to obtain different angles of the slot or conduct another flight plan 303 to obtain additional sensor input data 600. For instance, the control devices 111 can receive the electrical signals from the drone control system 110. The control devices 111 can be configured to implement the translated controls (e.g., electrical signals) from the drone control system 110.

In another embodiment, the sensor data input 600 may include angles of the slots 601-603 which all yield lower visibility levels. For instance, the visibility level for each of the objects detected may indicate a confidence level where the semantic fusion model 402 is unable to process the input sensor data input 600 to determine object classifications 501. Based on the lower visibility levels, the computing system 401 may cause the autonomous drone 100 to generate a modified flight plan 303 or another flight plan 303 to obtain additional sensor data inputs 600.

Figure 7A:
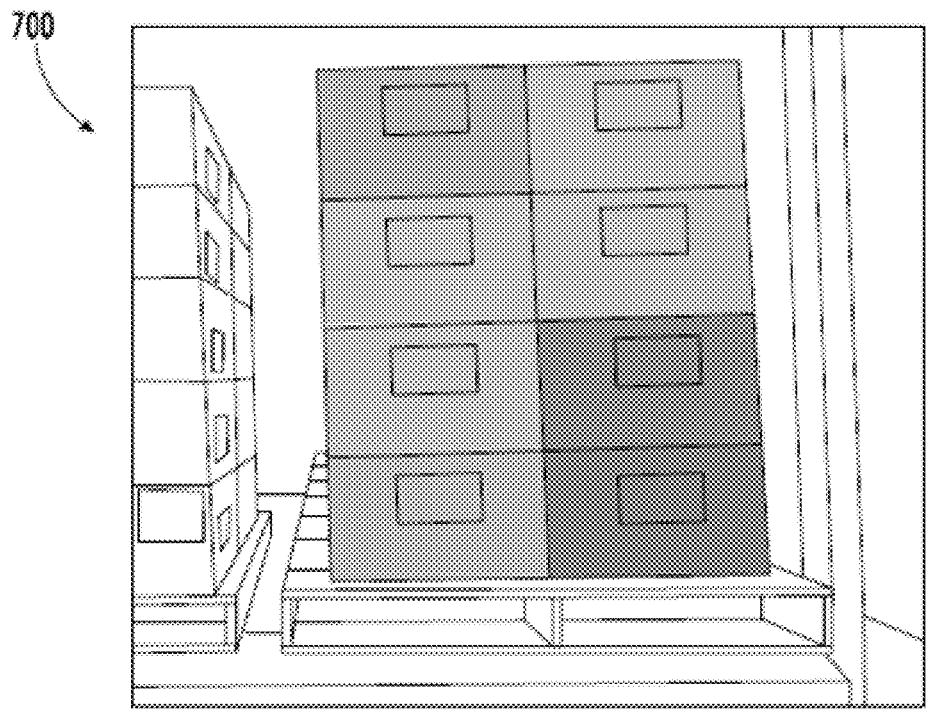
FIGS. 7A-B depicts example object detections, according to some implementations of the present disclosure.
Figure 7B:
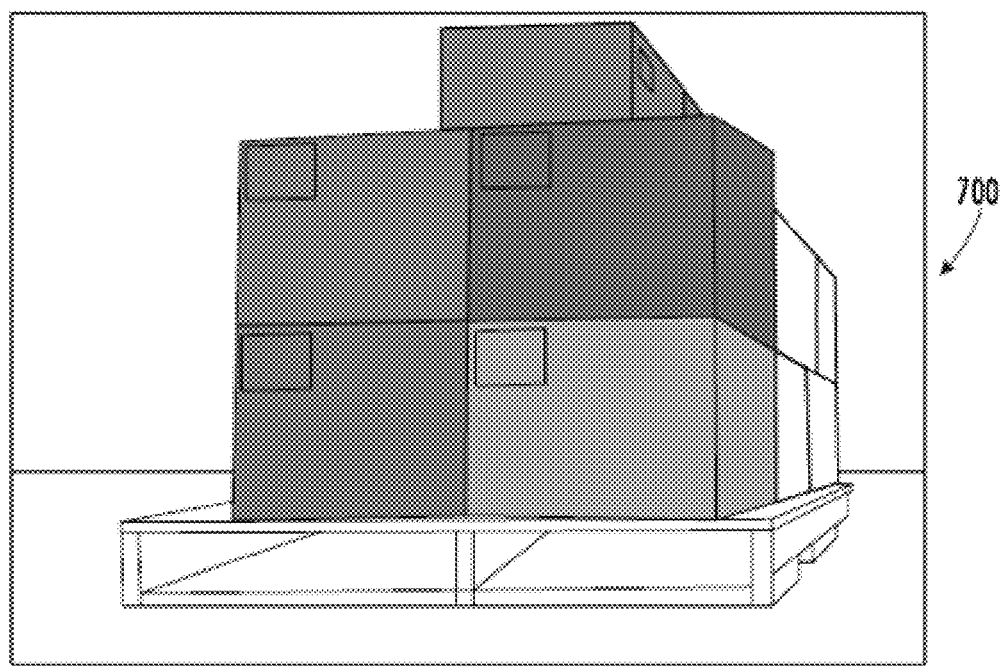

FIGS. 7A-B depicts example object detections, according to some implementations of the present disclosure. Referring first to FIG. 7A, the first sensor data input 700 may include an image frame of a slot containing a uniform set of stacked boxes (e.g., 2×4). A uniform set of stacked boxes may include boxes of the same or similar size stacked neatly in a predictable pattern. The first sensor data input 700 may be captured by an autonomous drone 100 or other sensor data capturing means. As depicted the objects depicted in the first sensor data input 700 may be captured from a front angle at a first time.

Based on the front angle, the semantic fusion model 402 may be able to generate object detections for each of the visible objects. The object detections may include generating a bounding shape over each of the objects. In some embodiments, the object detections may include color coding each of the objects to identify the object as being previously detected. The process of identifying each object detection in the first sensor data input 700 at a first time may enable the semantic fusion model 402 to iteratively update the semantic reconstruction 405 with additional dimensional information for sensor data 115 received at a second time. The second time may be at a subsequent time step or the same time step as the first time. For instance, multiple sensors from various computing systems (e.g., drones, stationary cameras, etc.) may be used to capture sensor data 115.

By way of example, FIG. 7B depicts a second sensor data input 701 of the first slot. The second sensor data input 701 may include the first slot from a side angle. The second sensor data input 701 may include a second image of the first slot at a second time. For example, the autonomous drone 100 may capture the first sensor data input 700 as it flies across the front of the slot and capture the second sensor data input 701 as it is flying past the slot. The stacked boxes contained in the slot from the first sensor data input 700 may be identified in the second sensor data input 701 based on the object detections (e.g., bounding shapes, color coding, labels, etc.).

However, the side angle of the slot in the second sensor data input 701 may provide additional dimensional information. For instance, as depicted, the second sensor data input 701 depicts the depth of the slot including two additional sets of boxes stacked behind the front facing boxes. In an embodiment, the semantic fusion model 402 may classify (e.g., object classifications 501) the two additional sets of boxes stacked behind the front facing boxes as partially occluded due to not being visible in the first sensor data input 700.

In some embodiments, the semantic fusion model may update the classifications of the front facing boxes based on the second sensor data input 701. For instance, the first sensor data input 700 may not include depth information such that the semantic fusion model 402 may generate an object classification 501 of partially occluded. However, based on the additional dimensional information included in the second sensor data input 701, the depth information may be sufficient to update the object classification to being a visible object. Accordingly, the additional dimensional information included in the second sensor data input 701 may be used to update the semantic reconstruction 405 thereby increasing the accuracy of the cuboid selections over time.

Figure 8:
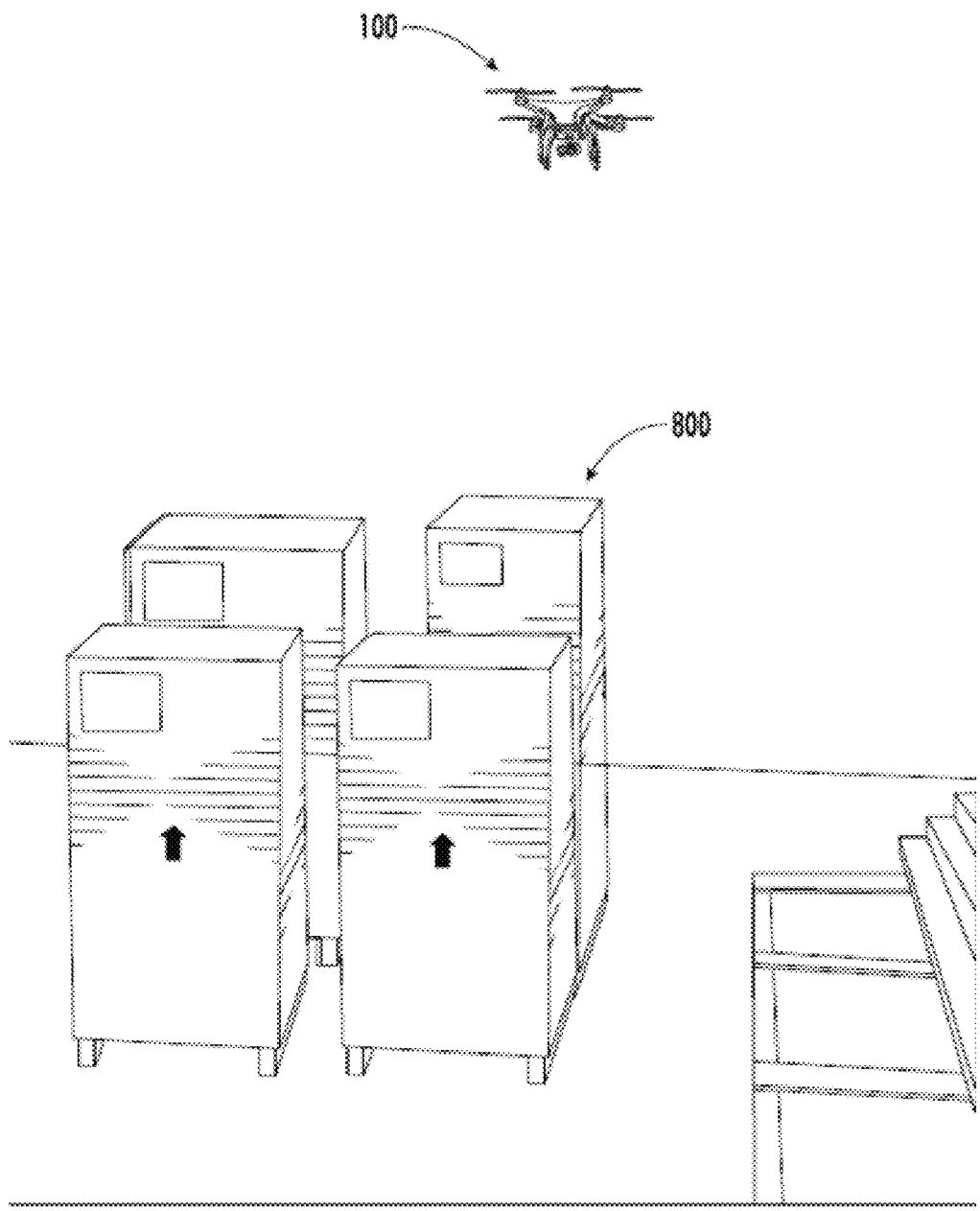
FIG. 8 depicts an example bulk object, according to some implementations of the present disclosure.

FIG. 8 depicts an example bulk object, according to some implementations of the present disclosure. As depicted in FIG. 8, an autonomous drone 100 may travel nearby (e.g., fly overhead) a plurality of bulk objects 800A-D within the warehouse environment 300 and capture sensor data 115 from a certain angle (e.g., overhead/top angle). The bulk objects 800A-C may be stored in a floor slot on the floor of the warehouse environment 300.

For instance, the bulk objects 800A-D may be stored on a collection of pallets in a designated location on the floor of the warehouse environment. In an embodiment, the bulk objects 800A-D may not be stored in an assigned slot. For instance, as the autonomous drone 100 moves throughout the warehouse environment 300, the bulk objects 800A-D may be detected and the autonomous drone 100 may capture sensor data 115 to detect and count the bulk objects 800A-D. The bulk objects 800A-D may be counted in a similar manner to smaller objects within the warehouse environment 300. For instance, bulk objects 800A-D may be counted and included in the total number of objects 407.

Figure 9:
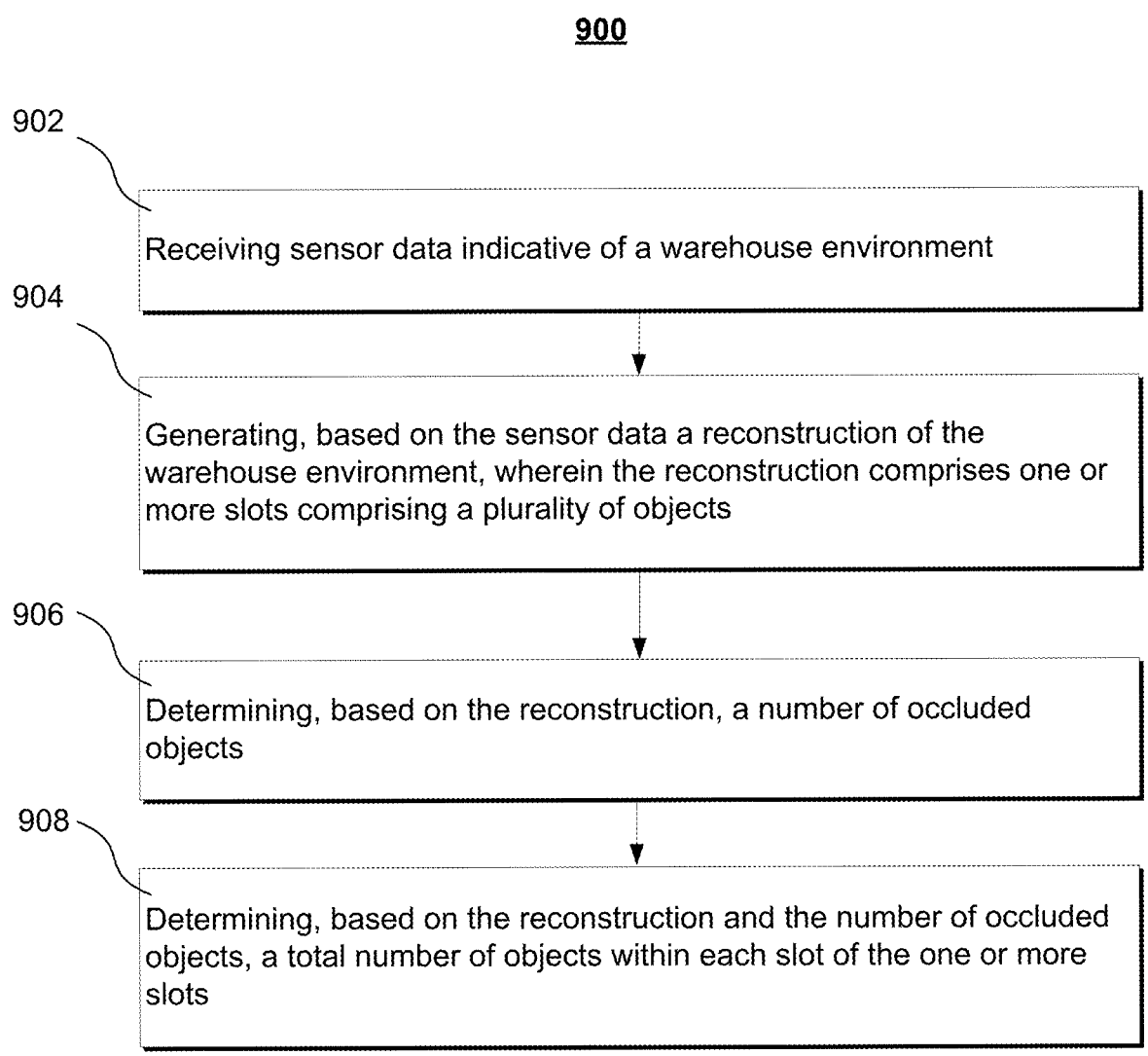
FIG. 9 depict an example method, according to some implementations of the present disclosure.

FIG. 9 depicts a flow chart of an example method, according to some implementations of the present disclosure. One or more portion(s) of the method 900 may be implemented by a computing system that includes one or more computing devices such as, for example, the computing systems described with reference to the other figures. Each respective portion of the method 900 may be performed by any (or any combination) of one or more computing devices. Moreover, one or more portion(s) of the method 900 may be implemented on the hardware components of the device(s) described herein (e.g., as in FIGS. 1-5, etc.), for example, to detect and count objects within the warehouse environment 300.

FIG. 9 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 may be performed additionally, or alternatively, by other systems.

At 902 the method 900 may include receiving sensor data indicative of a warehouse environment. For instance, the computing system 401 may receive sensor data 115 captured by an autonomous drone 100 operating within the warehouse environment 300. The sensor data 115 may include a plurality of image frames 115A of one or more slots. The slots may include a plurality of objects contained therein.

At 904 the method 900 may include generating, based on the sensor data a reconstruction of the warehouse environment, wherein the reconstruction includes one or more slots comprising a plurality of objects. For instance, the semantic fusion model 402 may analyze the plurality of image frames 115A and extract dimensional information for each of the slots depicted in the sensor data 115. For instance, the semantic fusion model 402 may analyze a first image frame depicting a slot containing a plurality of inventory items 302 bound together on a pallet. The semantic fusion model 402 may determine the dimensional shape and size (e.g., outermost boundaries) of the slot. Based on the dimensional information, the semantic fusion model 402 may generate a semantic reconstruction 405 of the slot.

The semantic reconstruction 405 may be a three dimensional representation of the slot depicted in the sensor data 115. For instance, the semantic fusion model 402 may determine the three dimensional volume of the slot and extract the dimensional data to generate the semantic reconstruction 405 as a three dimensional representation of the slot. The semantic reconstruction 405 may enable the computing system to mathematically represent the slot. By way of example, once the semantic fusion model 402 has determined the dimensional measurements of the slot, the semantic reconstruction 405 may be generated which represents a slot matching the dimensional measurements of the slot depicted in the sensor data 115.

At 906 the method 900 may include determining, based on the reconstruction, a number of occluded objects. For instance, the combinatorial optimization model 403 may receive the semantic reconstruction 405 which includes a dimensional representation of the slot. The dimensional representation may provide a set of constraints for applying mathematical algorithms to determine the number of occluded objects 406 that may be included in the volume of the slot. the combinatorial optimization model 403 may employ one or more algorithms to determine occluded objects that may be included in the slot.

By way of example, the combinatorial optimization model 403 may employ a "packing problem" algorithm to determine the occluded objects contained in the slot. The "packing problem" may apply algorithmic formulas to identify a minimum number of objects that fill the remaining unaccounted for volume of the slot by determining a cuboid of minimum size under continuous rotations, translations, and allowable distances within the three-dimensional size of the slot. This may include applying a set of physics rules to further narrow the number and size of cuboids which may fill the remaining unaccounted for volume. For instance, based on the cuboids associated with the visible and partially occluded objects, the combinatorial optimization model 403 may determine a number cuboids of similar size will satisfy the constraints of the unaccounted for volume. Moreover, the combinatorial optimization model 403 may determine only cuboids of differing sizes or quantities may satisfy the constraints of the unaccounted for volume.

Based on determining a number of cuboids that fit in the unaccounted volume of the slot in the semantic reconstruction 405, the combinatorial optimization model 403 may determine the number of occluded objects 406 and update the semantic reconstruction 405 to include cuboids representing occluded objects that are not visible or otherwise depicted in the sensor data 115.

At 908 the method 900 may include, determining, based on the reconstruction and the number of occluded objects, a total number of objects within each slot of the one or more slots. For instance, once the combinatorial optimization model 403 has updated the semantic reconstruction 405, the object counting model 404 may analyze the semantic reconstruction 405 including the occluded objects 406 and count each of the cuboid (e.g., associated with the visible object, partially occluded objects, and occluded objects 406) which fill the volume of the slot to determine the total number of objects 407.

Figure 10:
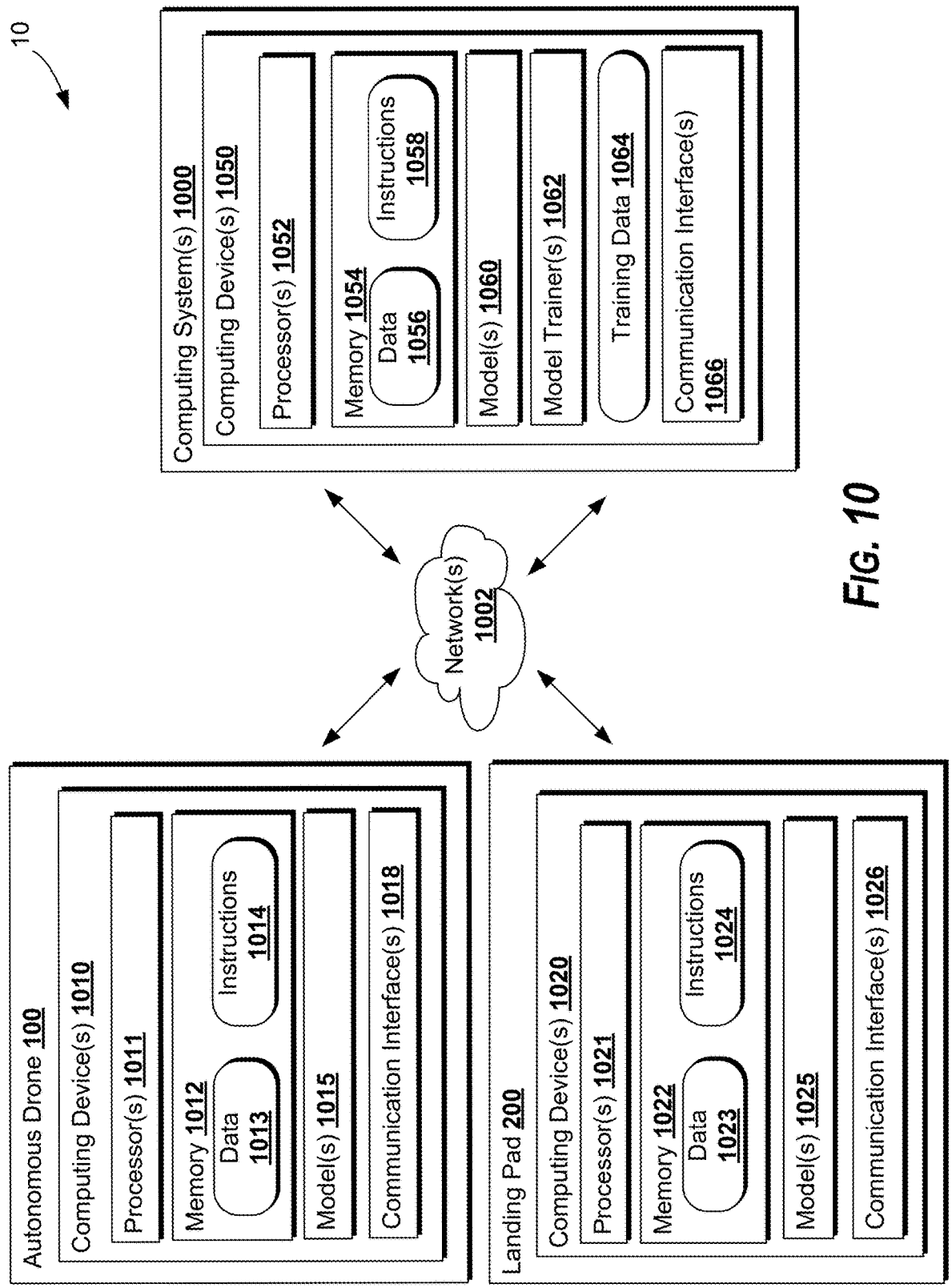
FIG. 10 depicts a block diagram of an example computing ecosystem, according to some implementations of the present disclosure.

FIG. 10. is a block diagram of an example computing ecosystem 10, according to some implementations of the present disclosure. The example computing ecosystem 10 can include an autonomous drone 100 and a landing pad 200 that are communicatively coupled over one or more networks 1002. In some implementations, the autonomous drone 100 and the landing pad 200 can communicate through a contact connection (e.g., wired ethernet connection) when the autonomous drone 100 is docked on the landing pad 200. In other implementations, the autonomous drone 100 and the landing pad 200 can communicate over a wireless connection (e.g., wireless local area network (WLAN), wireless wide area network (WWAN), near-field communication, other shorter distance communication protocols, etc.) while the autonomous drone 100 is in-flight. In some implementations, the autonomous drone 100 or the landing pad 200 can implement one or more of the systems, operations, or functionalities described herein for validating one or more systems or operational systems.

In some implementations, a computing system 1000, the autonomous drone 100, and/or the landing pad 200 can be communicatively coupled over one or more networks 1002. The computing system 1000 can be, for example, a cloud-based server system that is remote from the autonomous drone 100 and the landing pad 200. This may include, for example, a computing system associated with a warehouse, an entity associated with the inventory (e.g., shipper, manager, operator), an entity associated with the autonomous drone 100 (e.g., manufacturer, distributor, operator, maintainer), an entity associated with the landing pad 200 (e.g., manufacturer, distributor, operator, maintainer), etc. In some implementations, one or more of the networks 1002 used to communicate with the computing system 1000 may be different than one or more of the networks 1002 used by the autonomous drone 100 and the landing pad 200 to communicate with one another.

In some implementations, the computing devices 1010 can be included in an autonomous drone 100 and be utilized to perform the functions of an autonomous drone 100 as described herein. For example, the computing devices 1010 can be located onboard an autonomous drone 100 and implement the autonomy system 107 for autonomously operating the autonomous drone 100. In some implementations, the computing devices 1010 can represent the entire onboard computing system or a portion thereof (e.g., the drone localization system 108, the flight planning system 109, the drone control system 110, or a combination thereof, etc.). In other implementations, the computing devices 1010 may not be located onboard an autonomous drone 100. In some implementations, the autonomous drone 100 can include one or more distinct physical computing devices 1010.

The autonomous drone 100 (e.g., the computing device(s) 1010 thereof) can include one or more processors 1011 and a memory 1012. The one or more processors 1011 can be any suitable processing device (e.g., a processor core, a microprocessor, an ASIC, a FPGA, a controller, a microcontroller, etc.) and can be one processor or a plurality of processors that are operatively connected. The memory 1012 can include one or more non-transitory computer-readable storage media, such as RAM, ROM, EEPROM, EPROM, one or more memory devices, flash memory devices, etc., and combinations thereof.

The memory 1012 can store information that can be accessed by the one or more processors 1011. For instance, the memory 1012 (e.g., one or more non-transitory computer-readable storage media, memory devices, etc.) can store data 1013 that can be obtained (e.g., received, accessed, written, manipulated, created, generated, stored, pulled, downloaded, etc.). The data 1013 can include, for instance, sensor data 115, mission data 116, data associated with autonomy functions (e.g., data associated with the perception, planning, or control functions), simulation data, or any data or information described herein. In some implementations, the autonomous drone 100 can obtain data from one or more memory device(s) that are remote from the autonomous drone 100.

The memory 1012 can store computer-readable instructions 1014 that can be executed by the one or more processors 1011. The instructions 1014 can be software written in any suitable programming language or can be implemented in hardware. Additionally, or alternatively, the instructions 1014 can be executed in logically or virtually separate threads on the processor(s) 1011.

For example, the memory 1012 can store instructions 1014 that are executable by one or more processors (e.g., by the one or more processors 1011, by one or more other processors, etc.) to perform (e.g., with the computing device(s) 1010, the autonomous drone 100, or other system(s) having processors executing the instructions) any of the operations, functions, or methods/processes (or portions thereof) described herein.

In some implementations, the autonomous drone 100 can store or include one or more models 1015. In some implementations, the models 1015 can be or can otherwise include one or more machine-learned models (e.g., semantic fusion mode, combinatorial optimization mode, object counting model, etc.). As examples, the models 1015 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the autonomous drone 100 can include one or more models for implementing object detection and counting, including the computing system 401.

In some implementations, the autonomous drone 100 can obtain the one or more models 1015 using communication interface(s) 1018 to communicate with the landing pad 200 over the network(s) 1002. For instance, the autonomous drone 100 can store the model(s) 1015 (e.g., one or more machine-learned models) in the memory 1012. The autonomous drone 100 can then use or otherwise implement the models 1015 (e.g., by the processors 1011). By way of example, the autonomous drone 100 can implement the model(s) 1015 to detect and count objects in the warehouse environment 300.

In an embodiment, the one or more machine-learned models 1015 may be received from the computing system 1000 over networks 1002, stored in the computing system 100 (e.g., computing devices 1050), and then used or otherwise implemented by the processors 1011. In an embodiment, the computing system 1000 may implement multiple parallel instances of a single model.

Additionally, or alternatively, one or more machine-learned models 1011 may be included in or otherwise stored and implemented by the autonomous drone 100 that communicates with the computing system 100 according to a client-server relationship. For example, the machine-learned models 1015 may be implemented by the computing system 100 as a portion of a web service. Thus, one or more models 1060 may be stored and/or implemented (e.g., as models 1015) within the autonomous drone 100 and/or one or more models 1015 may be stored and implemented within the computing system 1000 (e.g. as models 1060).

The landing pad 200 can include one or more computing devices 1020. The landing pad 200 can include one or more processors 1021 and a memory 1022. The one or more processors 1021 can be any suitable processing device (e.g., a processor core, a microprocessor, an ASIC, a FPGA, a controller, a microcontroller, etc.) and can be one processor or a plurality of processors that are operatively connected. The memory 1022 can include one or more non-transitory computer-readable storage media, such as RAM, ROM, EEPROM, EPROM, one or more memory devices, flash memory devices, etc., and combinations thereof.

The memory 1022 can store information that can be accessed by the one or more processors 1021. For instance, the memory 1022 (e.g., one or more non-transitory computer-readable storage media, memory devices, etc.) can store data 1023 that can be obtained. The data 1023 can include, for instance, sensor data 115, mission data 116, data associated with a warehouse environment inventory management system, data associated with inventory scanning missions, or any data or information described herein. In some implementations, the landing pad 200 can obtain data from one or more memory device(s) that are remote from the landing pad.

For example, the memory 1022 can store instructions 1024 that are executable (e.g., by the one or more processors 1021, by one or more other processors, etc.) to perform (e.g., with the computing device(s) 1020, the landing pad 200, or other system(s) having processors for executing the instructions, such as computing device(s) 1010 or the autonomous drone 100) any of the operations, functions, or methods/processes described herein. This can also include, for example, validating a machined-learned operational system.

In some implementations, the landing pad 200 can store or include one or more models 1025. In some implementations, the models 1025 can be or can otherwise include one or more machine-learned models (e.g., semantic fusion mode, combinatorial optimization mode, object counting model, etc.). As examples, the models 1025 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the landing pad 200 can include one or more models for implementing object detection and counting, including the computing system 401.

In some implementations, the landing pad 200 can include one or more server computing devices. In the event that the landing pad 200 includes multiple server computing devices, such server computing devices can operate according to various computing architectures, including, for example, sequential computing architectures, parallel computing architectures, or some combination thereof.

The autonomous drone 100 and the landing pad 200 can each include communication interfaces 1018 and 1026, respectively. The communication interfaces 1018 and 1026 can be used to communicate with each other or one or more other systems or devices, including systems or devices that are remotely located from the autonomous drone 100 or the landing pad 200. The communication interfaces 1018 and 1026 can include any circuits, components, software, etc. for communicating with one or more networks (e.g., the network(s) 1002). In some implementations, the communication interfaces 1018 and 1026 can include, for example, one or more of a communications controller, receiver, transceiver, transmitter, port, conductors, software or hardware for communicating data.

In some examples, the communication interfaces 1018 and 1026 of the autonomous drone 100 and landing pad 200 can communicate through physical contact or wired connection while the autonomous drone 100 is docked on the landing pad 200. For example, the communication interface 1026 can include a mechanism (e.g., data pins) to transfer data to the communication interface 1018. In some examples, when the autonomous drone 100 makes contact with the landing pad 200 (e.g., data pins) a high-speed telecommunication channel can be established to allow for communication between the autonomous drone 100 and the landing pad 200.

In some examples, the communication interfaces 1018 and 1026 of the autonomous drone 100 and landing pad 200 can communicate wirelessly as the autonomous drone 100 flies throughout the warehouse environment. For example, the communication interface 1026 can emit a wireless signal (e.g., wireless local area network (WLAN)) which can be received by the communication interface 1018 of the autonomous drone 100 as the autonomous drone 100 flies throughout the warehouse environment. In some examples, a connection can be established between the communication interfaces 1018 and 1026 when the signal strength emitted from communication interface 1026 reaches a certain threshold. In some examples, the communication interface 1026 can include a pool of internet protocol (IP) addresses that are dynamically assigned to the communication interface 1018 of an autonomous drone 100 in range of the wireless signal.

The communication interfaces 1018 and 1026 can transition between contact (e.g., wired) communication and wireless communication. For example, when an autonomous drone 100 takes off to execute an inventory scanning mission, the communication interface 1026 of landing pads 200 can beacon (e.g., regular transmissions to inform devices about available access points) via communication interfaces 1018 of autonomous drones 100. In some examples, the communication interfaces 1026 of the autonomous drone 100 can beacon every 5 seconds to detect an autonomous drone 100 in range of the emitted signal. In some examples, the communication interfaces 1018 and 1026 can automatically activate a contact (e.g., wired) connection when the autonomous drone 100 docks on a landing pad 200. In some examples, the contact connection can generate an ethernet connection.

In some examples, the communication interfaces 1018 and 1026 can maintain a constant connection. For example, a warehouse environment 300 can include multiple landing pads 200 located throughout the warehouse environment 300. When an autonomous drone 100 flies throughout the warehouse environment 300, the wireless signal emitted from a first communication interface 1026 of a first landing pad 200 may decrease while the wireless signal emitted from a second communication interface 1026 of a landing pad 200 may increase. In some examples, the communication interfaces 1018 and 1026 may maintain a constant connection by seamlessly switching between different landing pads 200 as it flies throughout the warehouse environment 300. In some examples, the communication interfaces 1018 and 1026 can maintain a connection when the autonomous drone 100 docks on a landing pad 200 and activates a contact (e.g., wired) connection.

The computing system 1000 can include one or more computing devices 1050. The computing system 1000 can include one or more processors 1052 and a memory 1054. The one or more processors 1052 can be any suitable processing device (e.g., a processor core, a microprocessor, an ASIC, a FPGA, a controller, a microcontroller, etc.) and can be one processor or a plurality of processors that are operatively connected. The memory 1054 can include one or more non-transitory computer-readable storage media, such as RAM, ROM, EEPROM, EPROM, one or more memory devices, flash memory devices, etc., and combinations thereof.

The memory 1054 can store information that can be accessed by the one or more processors 1052. For instance, the memory 1054 (e.g., one or more non-transitory computer-readable storage media, memory devices, etc.) can store data 1056 that can be obtained. The data 1056 can include, for instance, any data or information described herein. In some implementations, the computing system 1000 can obtain data from one or more memory device(s) that are remote from the computing system 1000.

For example, the memory 1054 can store instructions 1058 that are executable (e.g., by the one or more processors 1052, by one or more other processors, etc.) to perform (e.g., with the computing device(s) 1050, the computing system 1000, or other system(s) having processors for executing the instructions) any of the operations, functions, or methods/processes described herein.

In some implementations, the computing system 1000 includes or is otherwise implemented by one or more server computing devices. In instances in which the computing system 1000 includes plural server computing devices, such server computing devices can operate according to sequential computing architectures, parallel computing architectures, or some combination thereof.

As described above, the computing system 1000 can store or otherwise include one or more models 1060. For example, the models 1060 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The other systems of ecosystem 10 can train the models 1015 and/or 1060 via interaction with the computing system 1000 that is communicatively coupled over the networks 1002. The computing system 1000 can be separate from the landing pad 200 or can be a portion of the landing pad 200.

The computing system 1000 can include a model trainer 1062 that trains the machine-learned models 1015 and/or 1060 stored at another computing system and/or the computing system 1000 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 1062 can perform a number of generalization techniques (e.g., weight decays, dropouts, etc.) to improve the generalization capability of the models being trained.

In particular, the model trainer 1062 can train the models 1015 and/or 1060 based on a set of training data 1064. The training data 1064 can include, for example, labelled training data including one or more labelled features.

The model trainer 1062 includes computer logic utilized to provide desired functionality. The model trainer 1062 can be implemented in hardware, firmware, and/or software controlling a general purpose processor. For example, in some implementations, the model trainer 1062 includes program files stored on a storage device, loaded into a memory and executed by one or more processors. In other implementations, the model trainer 1062 includes one or more sets of computer-executable instructions that are stored in a tangible computer-readable storage medium such as RAM, hard disk, or optical or magnetic media.

The network(s) 1002 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 1002 can be accomplished, for instance, through a network interface using any type of protocol, protection scheme, encoding, format, packaging, etc.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, may refer to "at least one of" or "any combination of" example elements listed therein, with "of" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. Some of the claims are described with a letter reference to a claim element for exemplary illustrated purposes and is not meant to be limiting.

What is claimed is:

1. A computer-implemented method comprising:
receiving sensor data indicative of a slot within a warehouse environment;
analyzing the sensor data to extract dimensional measurements associated with the slot, the dimensional measurements comprising a volume of the slot;
generating, based on the dimensional measurements, a reconstruction of the slot within the warehouse environment, wherein generating the reconstruction comprises:
determining a classification of at least one of a visible object and a partially visible object contained within the volume of the slot;
determining, based on the classification, one or more cuboids associated with at least one of the visible object or the partially visible object, the one or more cuboids comprising a three dimensional representation of the visible object or partially visible object,
determining, based on the one or more cuboids, one or more void detections within the volume of the slot, wherein the one or more void detections comprise an occluded volume within the volume of the slot;
determining, based on the reconstruction of the slot and the occluded volume of the slot, a number of occluded objects, wherein determining the number of occluded objects comprises:
determining a minimum number of occluded cuboids and a respective size of the minimum number of occluded cuboids that fill the occluded volume of the slot; and
determining, based on the minimum number of occluded cuboids, a total number of objects within the slot.

2. The computer-implemented method of claim 1, wherein the sensor data comprises at least one of (i) image data, (ii) LIDAR data, (iii) radar data, or (iv) video data.

3. The computer-implemented method of claim 2, wherein the (i) image data comprises a plurality of image frames depicting the slot from a plurality of angles.

4. The computer-implemented method of claim 1, wherein the sensor data is received from a drone operating within the warehouse environment.

5. The computer-implemented method of claim 1, wherein generating the reconstruction comprises:
    detecting a first object in a first slot depicted in the sensor data at a first time;
    detecting the first object in the first slot depicted in the sensor data at a second time; and
    classifying the first object, based on the sensor data at the first time and the second time in the first slot as the visible object or the partially visible object.

6. The computer-implemented method of claim 1, further comprising:
    determining, based on the one or more cuboids
    the total number of objects.

7. The computer-implemented method of claim 1, further comprising:
    determining a three-dimensional size of a plurality of slots within the warehouse environment.

8. The computer-implemented method of claim 1, wherein the slot comprises at least one of (i) a defined inventory rack location, (ii) a defined inventory shelf location, or (iii) a defined floor location within the warehouse environment.

9. The computer-implemented method of claim 1, further comprising:
    accessing inventory data indicative of an anticipated location of the slot within the warehouse environment.

10. The computer-implemented method of claim 1, further comprising:
    transmitting data indicative of the total number of objects within the slot to a remote computing system.

11. The computer-implemented method of claim 1, wherein the reconstruction is at least one of a (i) three-dimensional or (ii) four-dimensional representation of the slot within the warehouse environment.

12. A computing system comprising:
    one or more processors; and
    one or more non-transitory computer-readable media storing instructions that when executed by the one or more processors cause the computing system to perform operations, the operations comprising:
        receiving sensor data indicative of a slot within a warehouse environment;
        analyzing the sensor data to extract dimensional measurements associated with the slot, the dimensional measurements comprising a volume of the slot;
        generating, based on the dimensional measurements, a reconstruction of the slot within the warehouse environment, wherein generating the reconstruction comprises:
            determining a classification of at least one of a visible object and a partially visible object contained within the volume of the slot;
            determining, based on the classification, one or more cuboids associated with at least one of the visible object or the partially visible object, the one or more cuboids comprising a three dimensional representation of the visible object or partially visible object,
            determining, based on the one or more cuboids, one or more void detections within the volume of the slot, wherein the one or more void detections comprise an occluded volume within the volume of the slot;
        determining, based on the reconstruction of the slot and the occluded volume, a number of occluded objects, wherein determining the number of occluded objects comprises:
            determining a minimum number of occluded cuboids and a respective size of the minimum number of occluded cuboids that fill the occluded volume of the slot; and
            determining, based on the minimum number of occluded cuboids, a total number of objects the slot.

13. The computing system of claim 12, wherein the sensor data comprises at least one of (i) image data, (ii) LIDAR data, (iii) radar data, or (iv) video data.

14. The computing system of claim 13, wherein the (i) image data comprises a plurality of image frames depicting the slot from a plurality of angles.

15. The computing system of claim 12, wherein the sensor data is received from a drone operating within the warehouse environment.

16. The computing system of claim 12, wherein generating the reconstruction comprises:
    detecting a first object in a first slot depicted in the sensor data at first time;
    detecting the first object in the first slot depicted in the sensor data at a second time; and
    classifying the first object, based on the sensor data at the first time and the second time in the first slot as the visible object or the partially visible object.

17. The computing system of claim 12, wherein the operations further comprise:
    determining, based on the one or more cuboids
    the total number of objects.

18. A non-transitory computer-readable media storing instructions that are executable by one or more processors to perform operations, the operations comprising:
    receiving sensor data indicative of a slot within a warehouse environment;
    analyzing the sensor data to extract dimensional measurements associated with the slot, the dimensional measurements comprising a volume of the slot;
    generating, based on the dimensional measurements, a reconstruction of the slot within the warehouse environment, wherein generating the reconstruction comprises:
        determining a classification of at least one of a visible object and a partially visible object contained within the volume of the slot;
        determining, based on the classification, one or more cuboids associated with at least one of the visible object or the partially visible object, the one or more cuboids comprising a three dimensional representation of the visible object or partially visible object,
        determining, based on the one or more cuboids, one or more void detections within the volume of the slot, wherein the one or more void detections comprise an occluded volume within the volume of the slot;
    determining, based on the reconstruction of the slot and the occluded volume, a number of occluded objects, wherein determining the number of occluded objects comprises:

determining a minimum number of occluded cuboids and a respective size of the minimum number of occluded cuboids that fill the occluded volume of the slot; and determining, based on the minimum number of occluded cuboids, a total number of objects within slot.

* * * * *